(12) United States Patent
Kishi

(10) Patent No.: US 7,319,724 B2
(45) Date of Patent: Jan. 15, 2008

(54) RADIO EQUIPMENT USING IMAGE SIGNALS FOR COMPENSATING TRANSMISSION SIGNALS

(75) Inventor: Takahiko Kishi, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 767 days.

(21) Appl. No.: 10/631,655

(22) Filed: Jul. 31, 2003

(65) Prior Publication Data
US 2004/0022178 A1 Feb. 5, 2004

(30) Foreign Application Priority Data
Aug. 5, 2002 (JP) ............................. 2002-227769

(51) Int. Cl.
*H04K 1/02* (2006.01)
(52) U.S. Cl. .................. 375/297; 375/296; 455/126; 455/114.2; 455/114.3
(58) Field of Classification Search ................ 375/296, 375/297; 455/114.2, 126
See application file for complete search history.

(56) References Cited

U.S. PATENT DOCUMENTS

| | | | | |
|---|---|---|---|---|
| 4,291,277 | A * | 9/1981 | Davis et al. ................ | 330/149 |
| 5,483,681 | A * | 1/1996 | Bergsten et al. ............ | 455/126 |
| 5,535,247 | A * | 7/1996 | Gailus et al. ............... | 375/297 |
| 5,819,165 | A * | 10/1998 | Hulkko et al. .............. | 455/126 |
| 5,822,366 | A * | 10/1998 | Rapeli ........................ | 375/219 |
| 6,081,158 | A * | 6/2000 | Twitchell et al. ........... | 330/149 |
| 6,240,144 | B1 * | 5/2001 | Ha .............................. | 375/297 |
| 6,373,902 | B1 * | 4/2002 | Park et al. .................. | 375/296 |
| 6,591,090 | B1 * | 7/2003 | Vuorio et al. ............... | 455/126 |
| 6,728,224 | B1 * | 4/2004 | Kakizaki et al. ............ | 370/313 |
| 6,788,747 | B1 * | 9/2004 | Okanobu .................... | 375/316 |
| 6,806,746 | B1 * | 10/2004 | Mar ............................ | 327/105 |

FOREIGN PATENT DOCUMENTS

JP 8-223075 8/1996

OTHER PUBLICATIONS

Ghaderis M. et al, "Fast Adaptive Polynomial I and Q Predistorter with Global Optimisation", IEE Proceedings on Communications, vol. 143, No. 2, Apr. 1, 1996, pp. 78-86.*

* cited by examiner

*Primary Examiner*—Mohammed Ghayour
*Assistant Examiner*—Juan Alberto Torres
(74) *Attorney, Agent, or Firm*—The Farrell Law Firm, PC

(57) ABSTRACT

Disclosed is radio equipment for transmission and reception of Frequency Division Duplex mode signals and transmission signal characteristic compensation utilizing small-scaled circuit construction. A receiver converts Radio Frequency band signals from an antenna sharer to an Intermediate Frequency (IF) via a mixer and into digital signals utilizing an Analog-to Digital Converter. Reception signals and image signals of transmission signals, both having an IF A are contained in the converted signals, are converted into reception signals having an IF B and image signals having an IF C, respectively, which both have positive and negative carrier frequencies symmetrical to a zero frequency direct current component and are represented as a complex number. A transmitter converts the IF C into a baseband of image signals, and compensates signal characteristics relative to complex baseband signals of quantized transmission signals at a characteristic compensator using converted signals as reference signals.

16 Claims, 14 Drawing Sheets

(a)

(b)

(c)

RADIO EQUIPMENT USING IMAGE SIGNALS FOR COMPENSATING TRANSMISSION SIGNALS

PRIORITY

This application claims priority to an application entitled "Radio Equipment Having Function of Compensating Transmission Signals" filed in the Japanese Industrial Property Office on Aug. 5, 2002 and assigned Ser. No. 2002-227769, the contents of which are hereby incorporated by reference.

BACKGROUND OF THE INVENTION

1. Field of the Invention

The present invention relates generally to radio equipment, and more particularly, to radio equipment for compensating electrical power or characteristics of transmission signals through feedback of the transmission signals.

2. Description of the Related Art

Such radio equipment, for example, is disclosed in the Japanese unexamined patent publication No. 1996-223075, in which some transmission signals transmitted from an antenna are fed back to a generation circuit of the transmission signals, and thereby levels or characteristics of the transmission signals are detected. The levels or characteristics of the transmission signals transmitted from the antenna are compensated based on the detected levels or characteristics of the transmission signals.

More specifically, the radio equipment transmits the transmission signals transmitted from the antenna to the generation circuit of the transmission signals using a reception circuit to feed back the transmission signals, so that the transmission circuit and the reception circuit can be implemented as a very small-scaled circuit construction.

However, it is disclosed that the foregoing radio equipment simply uses a reception unit to feed back the transmission signals, but that transmission and reception signals allowing for the most effective use of the radio equipment are ones based on the TDD (Time Division Duplex) mode in which transmission operation does not concur with reception operation. Further, it is only described in the document that the radio equipment may be applied to signals based on the FDD (Frequency Division Duplex) mode in which transmission operation concurs with reception operation, but that it is necessary to momentarily stop the reception signals (i.e., to remove a sound) by means of a certain method in order to measure characteristics of the transmission signals. However, there is no disclosure with respect to a concrete method.

Consequently, even though the radio equipment may be applied to the transmission and reception signals based on the FDD mode, the conventional radio equipment has a problem in that it cannot compensate the levels and characteristics of the transmission signals transmitted from the antenna utilizing a small-scaled circuit construction.

SUMMARY OF THE INVENTION

Accordingly, the present invention has been designed to solve the above and other problems occurring in the prior art, and an object of the present invention is to provide radio equipment capable of transmitting and receiving signals in an FDD mode, and compensating characteristics of transmission signals utilizing a small-scaled circuit.

According to the present invention, the above and other objects can be accomplished by radio equipment, comprising at least one compensator for compensating characteristics of transmission signals; a transmitter for transmitting the transmission signals; a receiver for demodulating reception signals, comprises; at least one transmission signal distributor for inputting the transmission signals which the transmitter transmits toward the receiver; at least one first frequency converter for converting the reception signals into reception signals having a first intermediate frequency (IF) including a carrier frequency lower than a carrier frequency of the reception signals, and for obtaining image signals of the transmission signals having a carrier frequency around the first IF of the reception signals, wherein the compensator compensates characteristics of the transmission signals using characteristics of the image signals.

Thus, the radio equipment converts the reception signals into reception signals having a first IF including a carrier frequency lower than a carrier frequency of the reception signals, and at the same time extracts the transmission signals, which are obtained on the side of the receiver by the transmission signal distributor, as the image signals of the transmission signals having the carrier frequency around the first IF of the reception signals, by means of the first frequency converter. In addition, the compensator compensates characteristics of the transmission signals using characteristics of the image signals, so that without an additional circuit construction for extracting separate transmission signals, the characteristics of the transmission signals can be indirectly detected on the side of the receiver, and the detected characteristics can be used to compensate the characteristics of the transmission signals.

The transmission signal distributor includes an antenna sharer for inputting the transmission signals toward the receiver as leakage electrical power. Therefore, the radio equipment uses the transmission signal distributor as the antenna sharer for transmitting and receiving the transmission and reception signals to/from the same antenna, so that the transmission signals can be input toward the receiver as leakage electrical power of the antenna sharer without an additional new circuit construction.

The antenna sharer includes a filter for separating the transmission signals and the reception signals from each other. Further, the filter is adjusted to prevent an attenuation pole of the filter from being positioned within the frequency band of the transmission signals even though a pass frequency band of passing from the transmitter-sided input terminal of the antenna sharer to the receiver-sided output terminal is a stop band of the filter, and thus a signal pass-through characteristic in the frequency band of the transmission signals of the filter has a substantial horizontal frequency characteristic and a predetermined attenuation quantity. Therefore, the radio equipment adjusts the pass frequency band of passing from the transmitter-sided input terminal of the antenna sharer to the receiver-sided output terminal, even though the pass frequency band is the stop band of the filter for separating the transmission and reception signals from each other, so as to prevent the attenuation pole of the filter from being positioned within the frequency band of the transmission signals. The filter makes it possible to stably obtain the transmission signals on the side of the receiver owing to the characteristics having the substantial horizontal frequency characteristic and the predetermined attenuation quantity in the frequency band of the transmission signals.

The transmission signal distributor comprises a transmission signal separator for separating a part of electrical power of the transmission signals, and a mixer for mixing the separated transmission signals with the reception signals. Therefore, the radio equipment uses the transmission signal distributor as the transmission signal separator for separating a part of electrical power of the transmission signals and the mixer for mixing the separated transmission signals with the reception signals, so that the transmission signals can be certainly input toward the receiver.

The transmission signal distributor comprises an antenna sharer for inputting the transmission signals toward the receiver as leakage electrical power, a transmission signal separator for separating a part of electrical power of the transmission signals, a mixer for mixing the separated transmission signals with the reception signals, and a switch for connecting the transmission signal separator with the mixer. Therefore, when the transmission signals are not allowed to obtain sufficient electrical power from the leakage electrical power of the antenna sharer, the switch is closed, and then the transmission signals are input toward the receiver using the transmission signal separator and the mixer.

The radio equipment comprises the transmission signal separator for separating a part of electrical power of the transmission signals and the mixer for mixing the separated transmission signals with the reception signals together with the antenna sharer for transmitting and receiving the transmission and reception signals to/from the same antenna, all of which act as the transmission signal distributor. When a frequency characteristic is bad on a communication band edge or when the leakage electrical power of the antenna sharer is small due to an available frequency band in multi-band radio equipment, the switch is closed, and then the transmission signals are obtained at a proper level using the transmission signal separator and the mixer. In the other cases, the transmission signals are obtained at a proper level using the transmission signal separator and the mixer. Under any circumstance, the transmission signals are input to the receiver at a proper level.

The first frequency converter is a frequency converter for obtaining real output signals relative to real input signals. Therefore, the radio equipment can obtain the image signals of the transmission signals at a sufficient level. Further, the first frequency converter is a frequency converter for obtaining complex output signals relative to real input signals. Therefore, the radio equipment can obtain the image signals of the transmission signals at a level without having influence on the reception signals. For example, when the radio equipment, in which transmission signal waves and reception signal waves are easily separated from each other, are overlapped with each other at a frequency of the same carriers, as signals based on a CDMA (Code Division Multiple Access) or TDD mode, the reception signals and the image signals of the transmission signals, both of which have the first IF, are extracted at the same frequency, so that the number of times for performing frequency conversion can be reduced in the following processes.

The radio equipment further comprises a second frequency converter provided with a local oscillator for outputting complex local signals at a frequency equal to the carrier frequency of the reception signals having the first IF, for converting the reception signals having the first IF into a baseband of signals and for converting the image signals into image signals having the second IF. Thus, the compensator generates compensation signals for compensating the characteristics of the transmission signals from the image signals having the second IF.

When compensating only the level of the transmission signals, the radio equipment provides a preferential process of the reception signals and detects a change in the level of the transmission signals from the image signals having the IF as it is, and thereby the compensator compensates the level of the transmission signal. As a result, the radio equipment can remove a process in which the transmission signals are changed into a baseband.

The radio equipment may further comprise at least one second frequency converter, provided with a local oscillator for outputting complex local signals at a frequency equal to the carrier frequency of the image signals, for converting the image signals into a baseband of image signals. Thus, the compensator generates compensation signals for compensating the characteristics of the transmission signals from the baseband of image signals.

When compensating all signal characteristics including distortion of the transmission signals, the radio equipment separately prepares a frequency converter for the reception signals, provides a preferential process of the reception signals, changes the image signals of the transmission signals into a baseband, and detects the changed signals, and thereby enabling the compensator to compensate the characteristics of the transmission signals. As a result, the radio equipment reduces the number of times for performing frequency conversion when obtaining the characteristics of the transmission signals and exactly compensates the signals characteristics including a level or distortion of the transmission signals.

The radio equipment comprises at least one second frequency converter, provided with a local oscillator for outputting complex local signals at the middle frequency between the carrier frequency of the reception signals having the first IF and the carrier frequency of the image signals having the first IF, for converting the reception signals and the image signals, both of which have the first IF, into reception signals having the second IF and for converting image signals having the second IF, respectively, both of which have positive and negative carrier frequencies symmetrical to a direct current component having a frequency of zero; and a third frequency converter, provided with a local oscillator for outputting complex local signals at the same frequency as the carrier frequency of the image signals having the second IF, for converting the image signals having the second IF into a baseband of image signals. Thus, the compensator generates compensation signals for compensating the characteristics of the transmission signals from the baseband of image signals.

The radio equipment converts the reception signals and the image signals, both of which have the first IF, into the reception signals and the image signals, respectively, both of which have the second IF and positive and negative carrier frequencies symmetrical to the direct current component having the frequency of zero, changes the image signals of the transmission signals into a baseband and extracts signal characteristics of the changed results, in order to process the reception signals with ease. Thereby, the compensator compensates the characteristics of the transmission signals. Thus, the signal characteristics including a level or distortion of the transmission signals can be exactly compensated, and at the same time, a transmitter-sided circuit construction can be balanced with a circuit construction on the side of processing the transmission signals.

Further, the radio equipment further comprises a fourth frequency converter, in which complex codomain signals of the complex local signals of the third frequency converter is used as local signals of the fourth frequency converter in order to convert the reception signals having the second IF into a baseband of signals. Therefore, the radio equipment causes both the complex local signals of the frequency converter on the side of processing the transmission signals and the complex local signals of the frequency converter on the side of the receiver to have relations of a complex codomain with each other, so that only by inverting a sign of imaginary-axis signals of the complex local signals on one side, complex local signals can be generated on the other side.

Preferably, the complex local signals are allowed to change the third frequency converting means and the fourth frequency converting means, both of which have relations of the complex codomain with each other, into a synthetic converting means commonly using the third and fourth converting means. Thus, the radio equipment enables the circuit construction needed for the frequency converters (i.e., a multipliers in the case of processing digital signals) to be shared.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
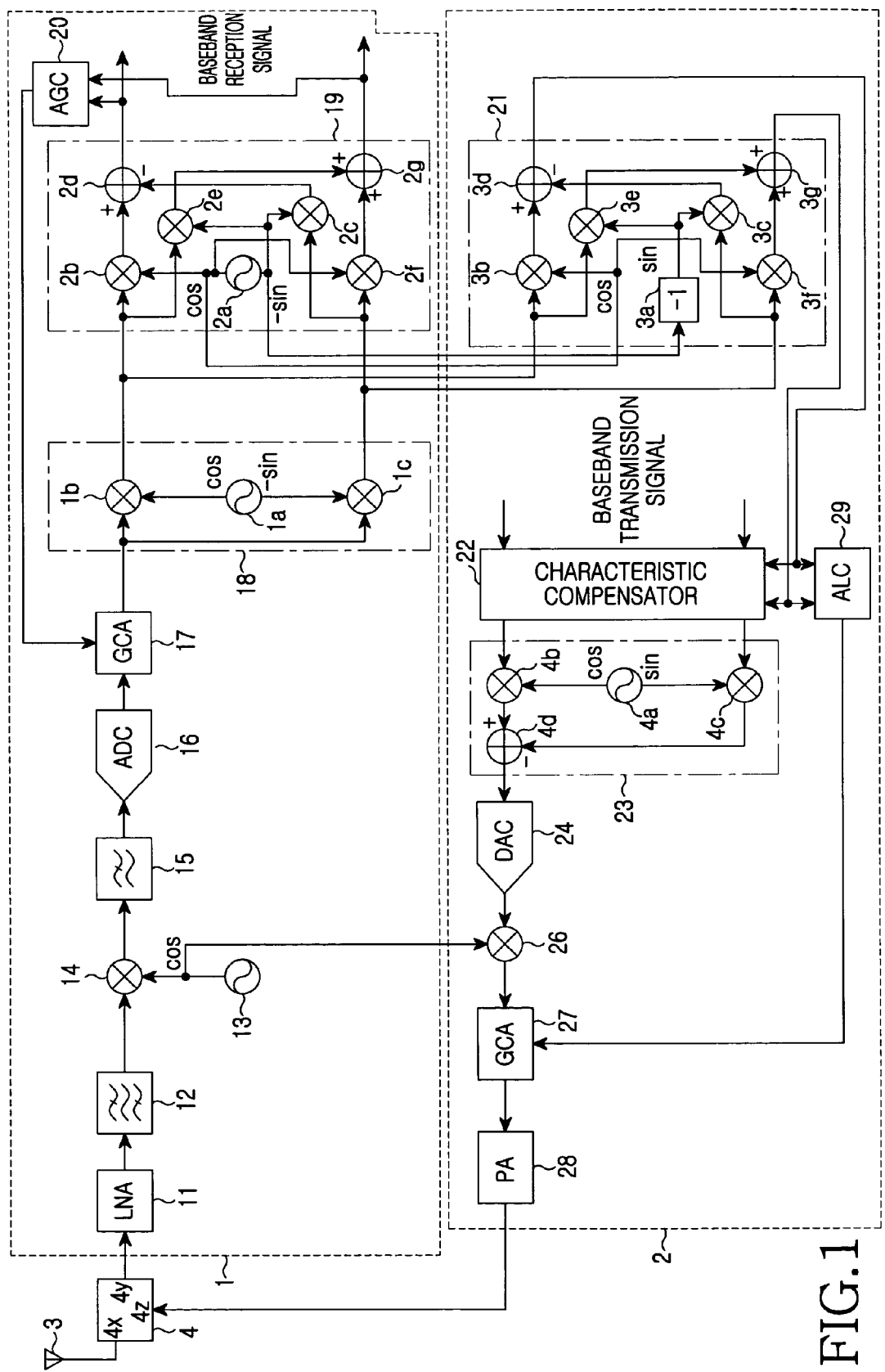
FIG. 1 is a block diagram illustrating radio equipment for compensating transmission signals according to a first example of a first embodiment of the present invention.

Hereinafter, preferred embodiments of the present invention will be described in detail with reference to the accompanying drawings. Above all, it should be noted that similar parts are given reference numerals and symbols as similar as possible throughout the drawings. In the following description, numerous specific details are set forth, such as specific circuit components, etc., to provide a thorough understanding of the present invention. However, it will be obvious to those skilled in the art that the present invention may be practiced without such specific details. In the description of the present invention, a detailed description of known functions and configurations incorporated herein will be omitted when it may make the subject matter of the present invention rather unclear.

I. First Embodiment

A. First Example of the First Embodiment

FIG. 1 is a block diagram illustrating radio equipment for compensating transmission signals according to a first example of a first embodiment of the present invention. With reference to FIG. 1, the radio equipment, which is provided with a receiver 1 for receiving signals transmitted from counterpart radio equipment and a transmitter 2 for transmitting signals to the counterpart radio equipment, includes an antenna 3 for transmitting and receiving the signals to/from the counterpart radio equipment, and an antenna sharer 4, such as a duplexer, circulator or the like, enabling the receiver 1 and the transmitter 2 to make common use of the antenna 3 and to transmit and receive the signals to/from the counterpart radio equipment.

Further, the antenna sharer 4 includes an antenna connection terminal 4x for connecting with the antenna 3, a receiver-sided output terminal 4y for connecting with the receiver 1, and a transmitter-sided input terminal 4z for connecting with the transmitter 2. The antenna sharer 4 outputs a reception signal band of signals, which are input into the antenna connection terminal 4x, to the receiver-sided output terminal 4y, and outputs a transmission signal band of signals, which are input into the transmitter-sided input terminal 4z, to the antenna connection terminal 4x.

The receiver 1 amplifies an RF (Radio Frequency) band of signals input from the receiver-sided output terminal 4y of the antenna sharer 4 using an LNA (Low Noise Amplifier) 11, filters the RF band of signals amplified by the LNA 11 using a reception filter 12, and extracts signals having a predetermined frequency band including the transmission signal band and the reception signal band. To extract signals having a desired carrier frequency from the predetermined frequency band of signals, which the reception filter 12 outputs, and quantize (i.e., carry out A/D conversion of) the extracted signals, a mixer 14 converts a predetermined frequency band of signals into signals having a first intermediate frequency (IF A) using the local signals which a carrier oscillator 13 outputs at a first frequency, and a low-pass filter 15 imposes band limitations on the signals, which the mixer 14 outputs, at a frequency less than half of a sampling frequency for quantization.

When the signals output from the mixer 14 are band-limited by the low-pass filter 15, the receiver 1 converts the signals band-limited by the low-pass filter 15 into digital ones, using an ADC (A/D converter) 16 for quantizing input signals at the sampling frequency corresponding to a bandwidth of the low-pass filter 15 according to the sampling theorem.

A GCA (Gain Control Amp.) 17, which maintains output signals at a uniform level by controlling a degree of amplification to amplify input signals, converts the quantized signals output from the ADC 16 into a uniform level of signals.

Further, the receiver 1 converts reception signals and image signals of transmission signals, both of which have the IF A and are contained in the signals output from the digital GCA 17, into reception signals having an IF B and image signals having an IF C, both of which have positive and negative carrier frequencies symmetrical to a direct current component having a frequency of zero and are represented as a complex number, by a quadrature detector 18 having a quadrature carrier oscillator for outputting complex local signals at a second frequency located at the middle of respective carrier frequency of the reception signals and the image signals of the transmission signals.

The reception signals having the IF B are converted into a baseband of reception signals by a frequency converter 19 having a quadrature carrier oscillator for outputting complex local signals having a third frequency, which is equal to a carrier frequency of the reception signals having the IF B.

Further, an amplification degree of the digital GCA 17 is controlled by an AGC (Auto Gain Control) circuit 20 that detects a level of the reception signals from the baseband of reception signals converted by the frequency converter 19, and by feeding the detected level back to the digital GCA 17 to uniformly maintain the reception signal level.

The quadrature detector 18 includes a quadrature carrier oscillator 1*a* for outputting complex local signals at a second frequency located at the middle of respective carrier frequency of the reception signals and the image signals of the transmission signals, both of which have the IF A and are output from the digital GCA 17, a multiplier 1*b* for multiplying real signals, which the digital GCA 17 outputs, by real-axis signals "cos" of local signals which the quadrature carrier oscillator 1*a* outputs at the second frequency, and a multiplier 1*c* for multiplying real signals, which the digital GCA 17 outputs, by imaginary-axis signals "-sin", which have a phase forwarded by 90 degrees relative to that of the real-axis signals. The quadrature detector 18 gets complex number signals by performing orthogonal transformation to the real signals output from the digital GCA 17.

The frequency converter 19 includes the quadrature carrier oscillator 2*a* for outputting complex local signals having a third frequency, which is equal to a carrier frequency of the reception signals having the IF B, multipliers 2*b* and 2*c* for multiplying real and imaginary-axis signals of the complex signals, which the quadrature detector 18 outputs, by real-axis signals "cos" of the local signals which the quadrature carrier oscillator 2*a* outputs at the third frequency, and by imaginary-axis signals "-sin", which have a phase forwarded by 90 degrees relative to that of the real-axis signals, respectively, a subtracter 2*d* for subtracting outputs of the multiplier 2*c* from outputs of the multiplier 2*b* and taking the subtracted results as outputs of the real-axis signals, multipliers 2*e* and 2*f* for multiplying real and imaginary-axis signals of the complex signals, which the quadrature detector 18 outputs, by imaginary-axis signals "-sin" and real-axis signals "cos", respectively, of the local signals which the quadrature carrier oscillator 2*a* outputs at the third frequency, and an adder 2*g* for adding outputs of the multiplier 2*f* to outputs of the multiplier 2*e* and taking the added results as outputs of the imaginary-axis signals. The frequency converter 19 converts the reception signals having the IF B, which are output from the quadrature detector 18, into the baseband of reception signals.

The transmitter 2 converts the image signals, which the quadrature detector 18 outputs at an IF C, into the baseband of image signals, utilizing the frequency converter 21, which takes complex codomain signals of the complex local signals, which the quadrature carrier oscillator 2*a* of the frequency converter 19 outputs at the third frequency, as local signals having a fourth frequency.

Using the baseband image signals, which are generated by the transmission signals transmitted from the antenna 3 and simultaneously converted into the baseband of signals by the frequency converter 21, as reference signals, a characteristic compensator 22 compensates signal characteristics, for example, in a manner that the transmission signals transmitted from the antenna 3 endow complex baseband signals of the quantized transmission signals with an inverse characteristic of phase or amplitude distortion which is applied to an amplifier (Amp) and so forth in the following processes.

To transmit the characteristic-compensated transmission signals, which the characteristic compensator 22 outputs, from the antenna 3, the complex baseband signals of the transmission signals are converted into transmission signals, which have an IF D and are represented as real signals, by a quadrature modulator 23 having a quadrature carrier oscillator for outputting complex local signals having a fifth frequency.

The transmitter 2 also converts the transmission signals, which are output from the quadrature modulator 23 at the IF D and are represented as quantized real signals, into analog transmission signals having the IF D by means of a DAC (D/A converter) 24 for converting input quantization signals into analog signals by performing D/A conversion. In order to transmit the analog transmission signals, which the DAC 24 outputs, from the antenna 3, the transmitter 2 converts the transmission signals having the IF D into transmission signals having a frequency of the transmission signal band utilizing a mixer 26 using the local signals which the carrier oscillator 13 outputs at the first frequency.

Additionally, an analog GCA (Gain Control Amplifier) 27, which controls a degree of amplification to amplify the input signals and maintains output signals at a uniform level, converts the transmission signals, which the mixer 26 outputs at the frequency of the transmission signal band, into signals having a uniform level. Subsequently, a PA (Power Amplifier) 28 amplifies the transmission signals having the frequency of the transmission signal band, which are controlled at a uniform level by the analog GCA 27, into a high level of signals for transmission from the antenna 3. Further, outputs of the PA 28 are sent from the transmitter-sided input terminal 4*z* of the antenna sharer 4 connected to the PA 28 through the antenna connection terminal 4*x* to the antenna 3, and thus transmitted to counterpart radio equipment.

Similar to the characteristic compensator 22, the amplification degree of the analog GCA 27 is controlled by an ALC (Auto Level Control) circuit 29 that detects a mean level of the transmission signals transmitted from the antenna 3, and then by feeding the mean level back to the analog GCA 27 to uniformly maintain the mean level, with the use of the baseband image signals output from the frequency converter 21 as reference signals.

As for the frequency converter 21, in order to obtain the complex codomain signals having the third frequency of complex local signals, which the quadrature carrier oscillator 2a of the frequency converter 19 outputs, the frequency converter 21 includes a sign inverter 3a for inverting signs of the imaginary-axis signals which the quadrature carrier oscillator 2a outputs, multipliers 3b and 3c for multiplying real and imaginary-axis signals of the complex signals, which the quadrature detector 18 outputs, by real-axis signals "cos" of the local signals which are output from the quadrature carrier oscillator 2a at the fourth frequency and generated from the local signals having the third frequency, and by imaginary-axis signals "sin" which have a phase delayed by 90 degrees relative to of the real-axis signals, respectively, a subtracter 3d for subtracting outputs of the multiplier 3c from outputs of the multiplier 3b and taking the subtracted results as outputs of the real-axis signals, multipliers 3e and 3f for multiplying real and imaginary-axis signals of the complex signals, which the quadrature detector 18 outputs, by imaginary-axis signals "sin" and real-axis signals "cos", respectively, of the local signals which are output from the quadrature carrier oscillator 2a at the fourth frequency and generated from the local signals having the third frequency, and an adder 3g for adding outputs of the multiplier 3f to outputs of the multiplier 3e and taking the added results as outputs of the imaginary-axis signals. The frequency converter 21 converts the image signals having the IF C, which the quadrature detector 18 outputs, into a baseband reception signals.

Further, the quadrature modulator 23 includes a quadrature carrier oscillator 4a for outputting the fifth frequency of complex local signals, a multiplier 4b for multiplying real-axis signals, which the characteristic compensator 22 outputs, by real-axis signals "cos" in the fifth frequency of local signals which the quadrature carrier oscillator 4a outputs, a multiplier 4c for multiplying imaginary-axis signals, which the characteristic compensator 22 outputs, by imaginary-axis signals "sin" which have a phase delayed by 90 degrees relative to that of the real-axis signals "cos" in the fifth frequency of local signals which the quadrature carrier oscillator 4a outputs, and a subtracter 4d for subtracting outputs of the multiplier 4c from outputs of the multiplier 4b and taking the subtracted results as outputs of the real-axis signals. The quadrature modulator 23 converts the complex baseband signals of the transmission signals into the transmission signals having the IF D and represented as the imaginary signals.

To perform frequency conversion of both the reception signals and the transmission signals at the mixer 14 and the mixer 26, respectively, using the local signals, which the carrier oscillator 13 outputs at the first frequency, a difference between the reception signal band and the transmission signal band when the transmission and reception signals are ones based on the FDD mode, is absorbed by a difference between the frequency of the local signals from the quadrature carrier oscillator 1a used in the quadrature detector 18 and the frequency of the local signals from the quadrature carrier oscillator 4a used in the quadrature modulator 23.

Subsequently, using the radio equipment of the present embodiment for compensating transmission signals as described above, a detailed description will be made with reference to a schematic diagram regarding a structure in which transmission signals transmitted from the antenna 3 are input as reference signals into the characteristic compensator 22 and the ALC circuit 29.

Figure 2:
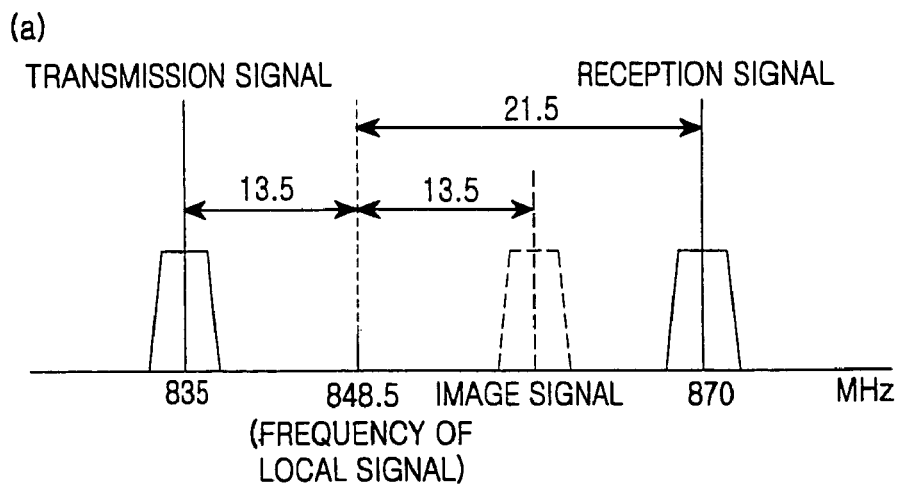
FIG. 2 is a schematic diagram illustrating an arrangement of transmission and reception signals on a frequency axis in the first example of the first embodiment of the present invention.
Figure 2:
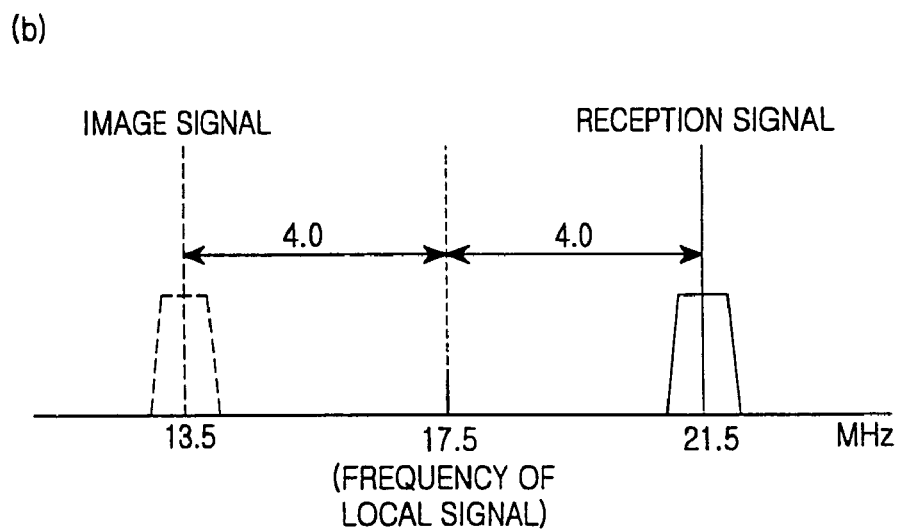
Figure 2:
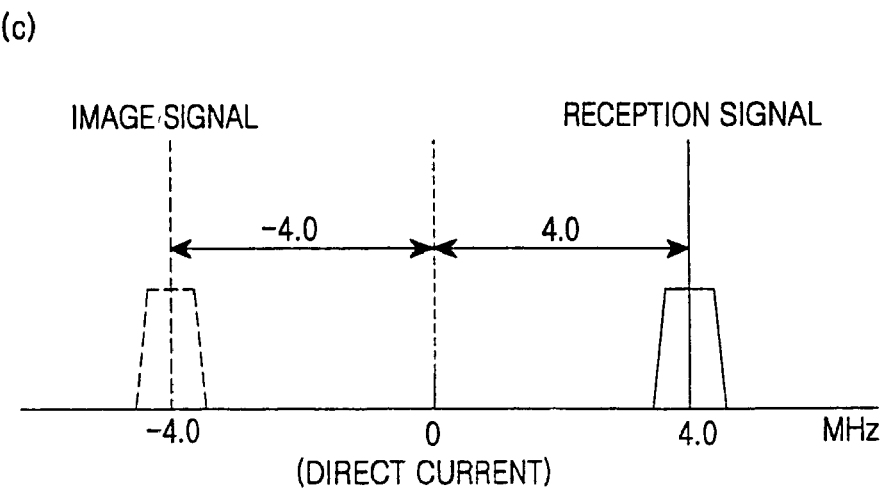

FIG. 2 is a schematic diagram for describing a structure in which transmission signals transmitted from the antenna 3 are obtained as reference signals in the characteristic compensator 22, and illustrates transmission signals having a frequency of 835 [MHz], reception signals having a frequency of 870 [MHz], and local signals output from the carrier oscillator 13 having a first frequency of 848.5 [MHz].

In FIG. 1, the transmission signals, which are output from the PA 28 of the transmitter 2 at a carrier frequency of 835 MHz, are mostly transmitted from the transmitter-sided input terminal 4z of the antenna sharer 4 through the antenna connection terminal 4x to the antenna 3 and then to the counterpart radio equipment, but can be partially detected as leakage electrical power at the receiver-sided output terminal 4y of the antenna sharer 4.

As illustrated in FIG. 2(a), when the transmission signals are input into the mixer 14 at a carrier frequency of 835 MHz and when the reception signals are input into the mixer 14 at a carrier frequency of 870 MHz, both of the transmission and reception signals are frequency-converted by the local signals which the carrier oscillator 13 outputs at a frequency of 848.5 MHz, so that reception signals of an IF of 21.5 MHz and image signals of an IF of 13.5 MHz generated from the transmission signals are output from the mixer 14, as illustrated in FIG. 2(b). Further, when the reception signals of the IF of 21.5 MHz and the image signals of the IF of 13.5 MHz generated from the transmission signals are input into the quadrature detector 18 in which the complex local signals output from the quadrature carrier oscillator 1a are set to have a frequency of 17.5 MHz, reception signals of an IF of 4.0 MHz and the image signals of an IF of −4.0 MHz, both of which are located at a position symmetrical to a direct current component having a frequency of zero, are output as outputs of the quadrature detector 18, as illustrated in FIG. 2(c). Therefore, the reception signals of the IF of 4.0 MHz can be converted into baseband reception signals by the frequency converter 19 in which the quadrature carrier oscillator 2a outputs the complex local signals at a frequency of 4.0 MHz.

Further, by the frequency converter 21 in which complex signals of a frequency of −4.0 MHz, which are generated as complex codomain signals of the complex local signals output from the quadrature carrier oscillator 2a, are used as local signals, the image signals having the IF C can be converted into a baseband of image signals.

Here, for example, when the antenna sharer 4 is used as a duplexer, in terms of a frequency characteristic around 870 MHz in the duplexer, even though a pass frequency band of passing from the transmitter-sided input terminal 4z of the duplexer to the receiver-sided output terminal 4y is, for example, a stop band of a filter having an attenuation quantity of 35 [dB], it is preferable that an attenuation pole of the filter is adjusted not to be positioned within the frequency band of the transmission signals, and that a signal pass characteristic in the frequency band of the transmission signals of the filter has a substantial horizontal frequency characteristic and a predetermined attenuation quantity (e.g., the foregoing attenuation quantity of 35 [dB]), and thereby the transmission signals can be input toward the receiver 1 without any distortion.

Figure 3:
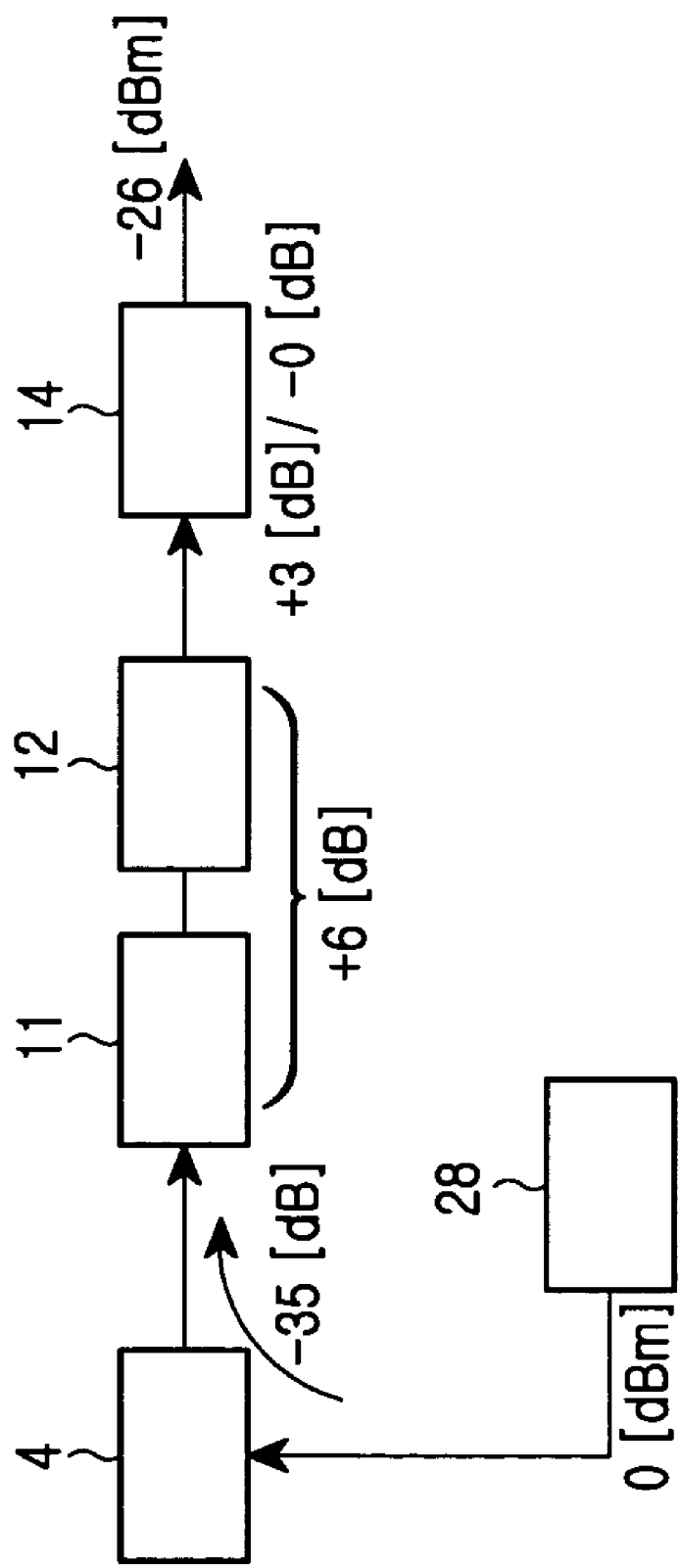
FIG. 3 is a schematic diagram illustrating a level of transmission signals obtained on the side of a receiver in the first example of the first embodiment of the present invention.

Additionally, in the present embodiment, when a level of the image signals of the transmission signals is calculated at the output of the mixer 14, as shown in the schematic diagram of FIG. 3, for example, when the transmission signals transmitted from the antenna 3 has a level of 0 [dBm], the antenna sharer (duplexer) 4 has a leakage electrical power attenuation quantity of 35 [dB], the LNA 11 and the reception filter 12 have the total gain of 6 [dB], the mixer 14 has a gain of 3 [dB], and the image signals of the mixer 14 has a suppressed level of 0 [dB], the level of the image signals of the transmission signals at the output of the mixer 14 is obtained by the following Equation 1.

Equation 1

$$0 \text{ [dBm]} - 35 \text{ [dB]} + 6 \text{ [dB]} + 3 \text{ [dB]} - 0 \text{ [dB]} = -26 \text{ [dB]} \quad (1)$$

As described above, the first example of the first embodiment is designed to extract the image signals of the transmission signals at a sufficient level and simultaneously to process the reception signals with ease using the mixer 14, in such a manner that the quadrature detector 18 converts the reception signals and image signals, both of which are extracted at the first IF, into the reception signals having the second IF and the image signals having the second IF, respectively, both of which have positive and negative carrier frequencies symmetrical to the direct current component having a frequency of zero, that the frequency converter 21 causes the image signals of the transmission signals to become an image band and then extracts a signal characteristic of the image signals of the transmission signals, and thereby the characteristic compensator 22 compensates a characteristic of the transmission signals. Thus, signal characteristics including a level or distortion of the transmission signals can be exactly compensated, and at the same time a transmitter-sided circuit construction can be balanced with a circuit construction on the side of processing the transmission signals.

B. Second Example of the First Embodiment

Figure 4:
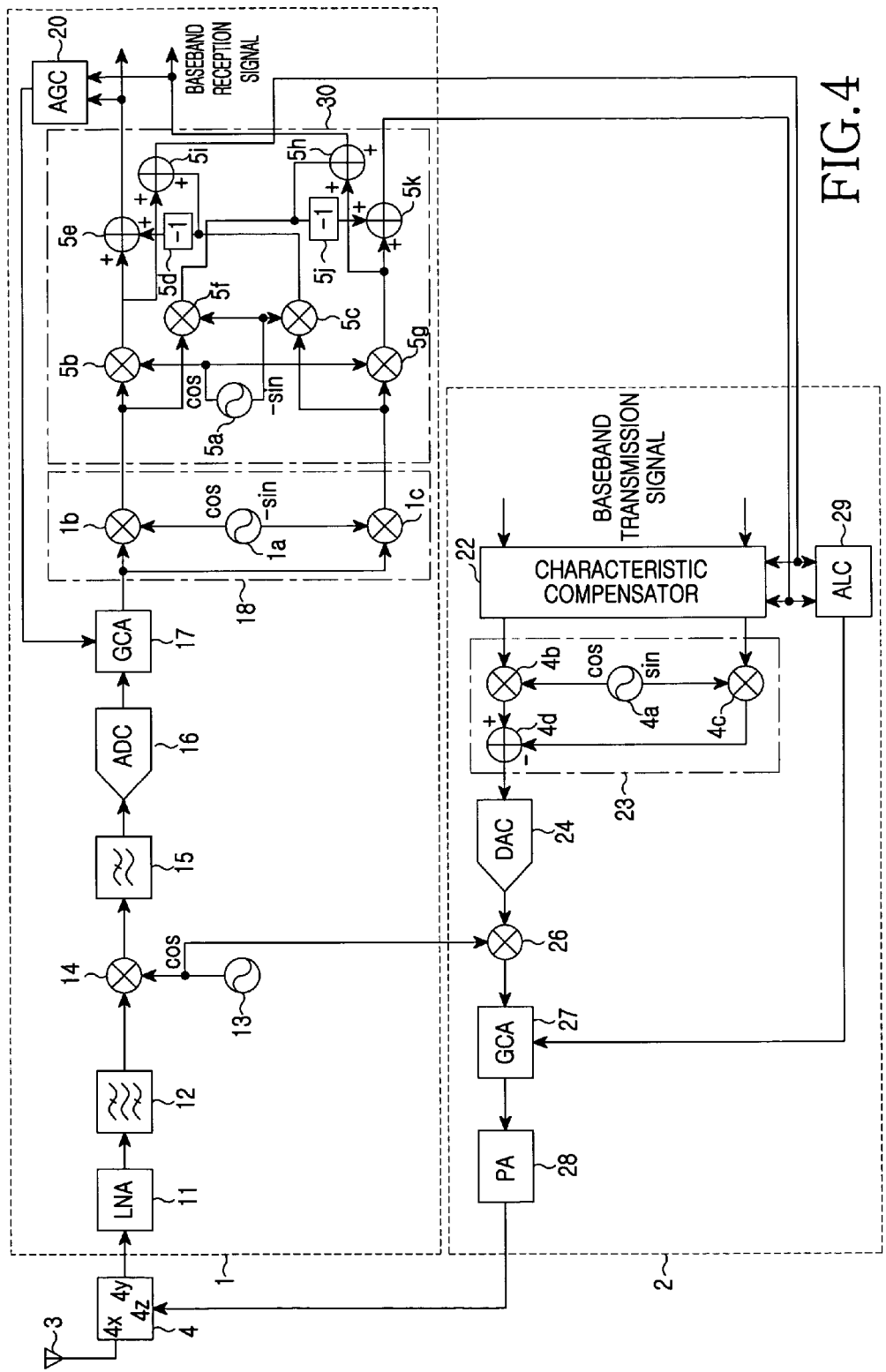
FIG. 4 is a block diagram illustrating radio equipment for compensating transmission signals according to a second example of the first embodiment of the present invention.

FIG. 4 is a block diagram illustrating radio equipment for compensating transmission signals in accordance with a second example of the first embodiment of the present invention. In FIG. 4, the radio equipment is characteristic of the radio equipment which was described in the first example of the first embodiment. In particular, the radio equipment modifies both the frequency converter 19 on the side of the receiver 1 and the frequency converter 21 on the side of the transmitter 2 into a synthetic frequency converter 30, which commonly uses of the multipliers. Further, in FIG. 4, components having the same reference numeral and symbol as in the first example of the first embodiment perform the same operation as ones mentioned in the first example of the first embodiment, and thus their description is omitted here.

With reference to FIG. 4, the radio equipment converts both reception signals and image signals of transmission signals, both of which a digital GCA 17 outputs at an IF A, into reception signals having an IF B and image signals having an IF C, respectively, by means of a quadrature detector 18, wherein the quadrature detector 18 is provided with a quadrature carrier oscillator for outputting complex local signals at a second frequency located at the middle of a carrier frequency which the reception signals and the other image signals of transmission signals each have, and wherein the reception signals having the IF B and the image signals having the IF C have positive and negative carrier frequencies symmetrical to a direct current component having a frequency of zero and are represented as complex numbers at the same time.

By a synthetic frequency converter 30 provided with the quadrature carrier oscillator for outputting complex local signals having a third frequency equal to a carrier frequency of the reception signals having the IF B, the reception signals having the IF B are converted into a baseband of reception signals, and at the same time the image signals having the IF C are converted into a baseband of image signals. The baseband of image signals are then input into a characteristic compensator 22 and an ALC circuit 29.

The synthetic frequency converter 30 includes a quadrature carrier oscillator 5a for outputting complex local signals having a third frequency, multipliers 5b and 5c for multiplying real-axis signals and imaginary-axis signals, both of which are input from a quadrature detector 18, by real-axis signals and imaginary-axis signals respectively, both of which the complex local signals generated from the quadrature carrier oscillator 5a have, and an adder 5e for causing a sign of outputs of the multiplier 5c to be inverted by a sign inverter 5d, adding the inverted outputs of the multiplier 5c to outputs of the multiplier 5b, and taking the added results as real-axis signal outputs of the reception signals contained in two kinds of real-axis signal outputs.

Further, the synthetic frequency converter 30 includes multipliers 5f and 5g for similarly multiplying real-axis signals and imaginary-axis signals, both of which are input from a quadrature detector 18, by real-axis signals and imaginary-axis signals, respectively, both of which the complex local signals generated from the quadrature carrier oscillator 5a have, and an adder 5h for adding outputs of the multiplier 5g to outputs of the multiplier 5f and taking the added results as imaginary-axis signal outputs of the reception signals contained in two kinds of imaginary-axis signal outputs.

Additionally, the synthetic frequency converter 30 includes an adder 5i for adding outputs of the multiplier 5c to outputs of the multiplier 5b and taking the added results as real-axis signal outputs of the image signals contained in two kinds of real-axis signal outputs, and an adder 5k for causing an output sign of the multiplier 5f to be inverted by a sign inverter 5j, adding the inverted outputs of the multiplier 5f to outputs of the multiplier 5g, and taking the added results as imaginary-axis signal outputs of the image signals contained in two kinds of imaginary-axis signal outputs. Thus, the synthetic frequency converter 30 does not only convert the reception signals having the IF B into a baseband of reception signals, but also convert the image signals having the IF C into a baseband of image signals.

As described above, in the second example of the first embodiment, both the frequency converter 19 on the side of the receiver 1 and the frequency converter 21 on the side of the transmitter 2 in the radio equipment having a function of compensating transmission signals which has been described in the first example of the first embodiment, are modified into a synthetic frequency converter 30 constructed to make common use of multipliers of the converters 19 and 21, so that the radio equipment according to the second example of the first embodiment can simplify its circuit construction, thus reducing its circuit dimensions and saving its space as well as its electrical power.

C. Third Example of the First Embodiment

Figure 5:
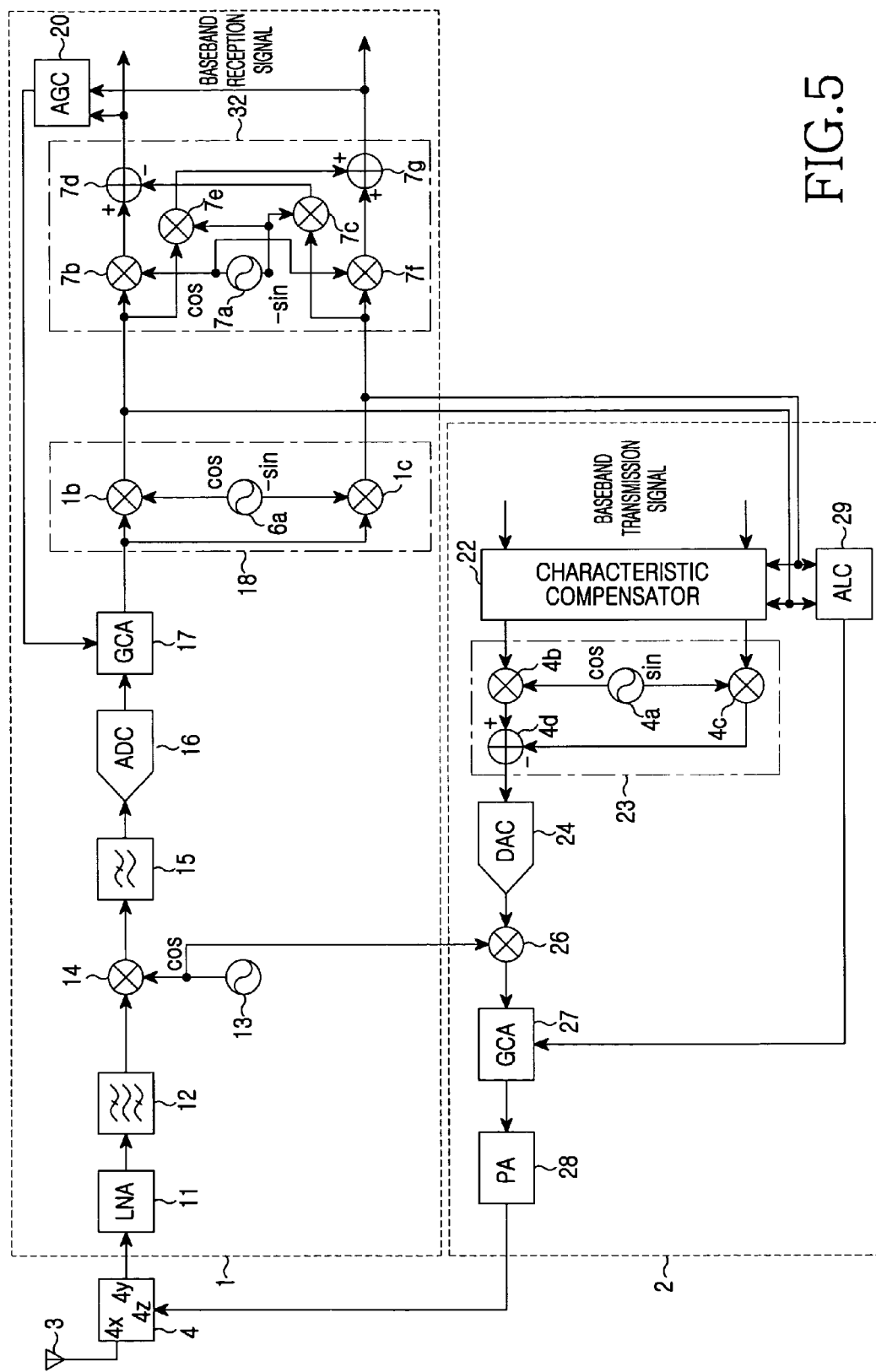
FIG. 5 is a block diagram illustrating radio equipment for transmission signals according to a third example of the first embodiment of the present invention.

FIG. 5 is a block diagram illustrating radio equipment for compensating transmission signals in accordance with a third example of the first embodiment of the present invention. In FIG. 5, the radio equipment is characterized in that the frequency converter 21 on the side of the transmitter 2 of the radio equipment which has been described in the first example of the first embodiment has been omitted, the frequency converter 19 on the side of the receiver 1 is provided with a quadrature carrier oscillator 6a for outputting complex local signals having a sixth frequency equal to the carrier frequency of the image signals of the transmission signals which the digital GCA 17 outputs, instead of the quadrature carrier oscillator 1a for outputting the complex local signals having the second frequency located in the middle of respective carrier frequency of the reception signals and the image signals of transmission signals, both of which the digital GCA 17 outputs at the IF A, and the image signals of the transmission signals are converted into a baseband of image signals by the quadrature detector 18.

Further, the radio equipment of this embodiment is characterized in that reception signals having the IF A are converted into reception signals having an IF E by the quadrature detector 18, so that the reception signals having the IF E are converted into a baseband of reception signals by a frequency converter 32, instead of the frequency converter 19, in which the frequency converter 32 is provided with a quadrature carrier oscillator for outputting complex local signals having a seventh frequency, which is equal to the carrier frequency of the reception signals having the IF E. Further, in FIG. 5, components having the same reference numeral and symbol as in the first example of the first embodiment perform the same operation as ones mentioned in the first example of the first embodiment, and thus their description is omitted here.

Referring to FIG. 5, the radio equipment is designed so that reception signals and image signals of transmission signals which a digital GCA 17 outputs at the IF A are input into the quadrature detector 18 having a quadrature carrier oscillator for outputting complex local signals having a sixth frequency equal to the carrier frequency of the image signals, so that at least image signals of transmission signals are directly converted into a baseband of image signals, and then the baseband of image signals are input into a characteristic compensator 22 and an ALC circuit 29. Reception signals having the IF A are converted into reception signals having an IF E by the quadrature detector 18, so that the reception signals having the IF E are converted into a baseband of reception signals by a frequency converter 32 having a quadrature carrier oscillator for outputting complex local signals having a seventh frequency equal to the carrier frequency of the reception signals having the IF E.

Further, as for the frequency converter 32, the frequency converter 32 includes a quadrature carrier oscillator 7a for outputting complex local signals having a seventh frequency equal to the carrier frequency of the reception signals having the IF E, multipliers 7b and 7c for multiplying real-axis signals and imaginary-axis signals, which the quadrature detector 18 outputs, by real-axis signals "cos" of the seventh frequency of local signals which the quadrature carrier oscillator 7a outputs, and by imaginary-axis signals "-sin" which have a phase forwarded by 90 degrees relative to that of the real-axis signals, a subtracter 7d for subtracting outputs of the multiplier 7c from outputs of the multiplier 7b and taking the subtracted results as outputs of the real-axis signals, multipliers 7e and 7f for multiplying real-axis signals and imaginary-axis signals, which the quadrature detector 18 outputs, by imaginary-axis signals "-sin" and real-axis signals "cos" of the local signals which the quadrature carrier oscillator 7a outputs at the seventh frequency, and an adder 7g for adding outputs of the multiplier 7f to outputs of the multiplier 7e and taking the added results as outputs of the imaginary-axis signals. The frequency converter 32 converts the reception signals, which the quadrature detector 18 outputs at the IF E, into a baseband of reception signals.

Subsequently, using the radio equipment of the present embodiment for compensating transmission signals as described above, a detailed description will be made with reference to a schematic diagram regarding a structure in which transmission signals transmitted from the antenna 3 are input as reference signals into the characteristic compensator 22 and the ALC circuit 29.

Figure 6:
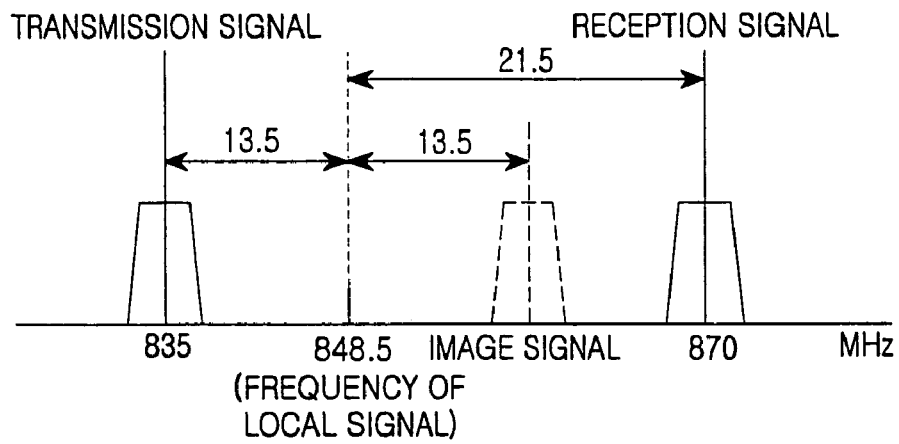
FIG. 6 is a schematic diagram illustrating an arrangement of transmission and reception signals on a frequency axis in the third example of the first embodiment of the present invention.
Figure 6:
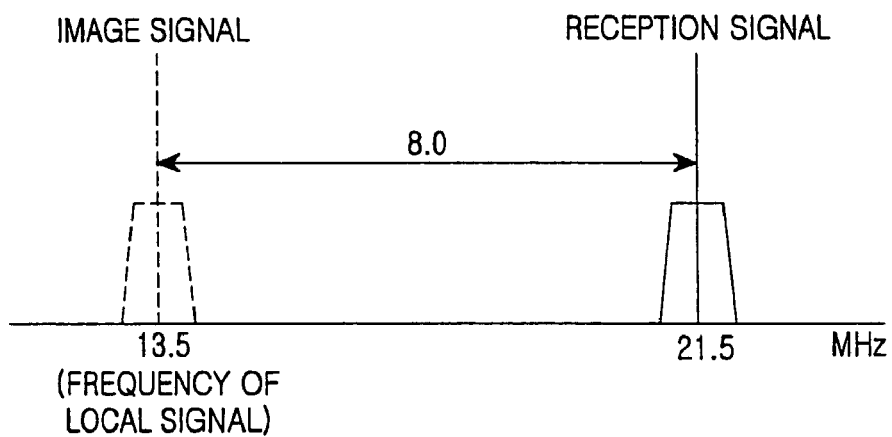
Figure 6:
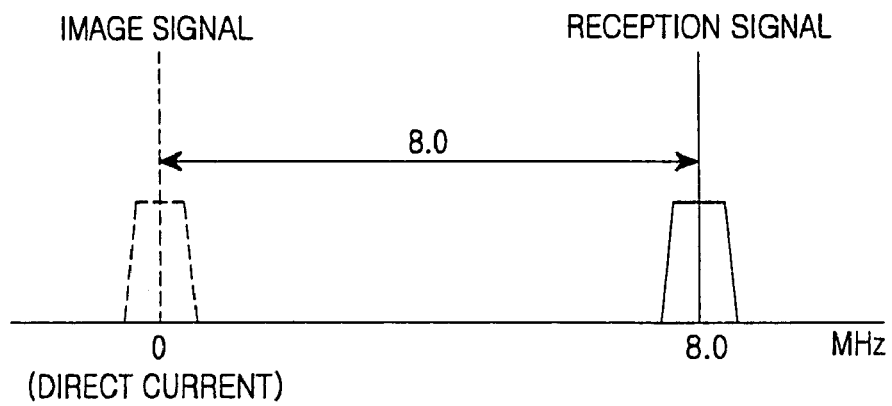

FIG. 6 is a schematic diagram for describing a structure in which transmission signals transmitted from the antenna 3 are obtained as reference signals at the characteristic compensator 22, and illustrates, similar to FIG. 2, transmission signals having a frequency of 835 [MHz], reception signals having a frequency of 870 [MHz], and local signals output from the carrier oscillator 13 having a first frequency of 848.5 [MHz].

As illustrated in FIG. 6(a), when the transmission signals are input into the mixer 14 at the carrier frequency of 835 [MHz] and when the reception signals are input into the mixer 14 at the carrier frequency of 870 [MHz], both of the transmission and reception signals are frequency-converted by the local signals, which the carrier oscillator 13 outputs at the frequency of 848.5 [MHz], so that reception signals having the IF of 21.5 [MHz] and image signals having the IF of 13.5 [MHz] and generated from the transmission signals are output from the mixer 14, as illustrated in FIG. 6(b). Further, when the reception signals having the IF of 21.5 [MHz] and the image signals having the IF of 13.5 [MHz] and generated from the transmission signals are input into the quadrature detector 18, in which the complex local signals output from the quadrature carrier oscillator 6a are set to have a frequency of 13.5 [MHz], reception signals having the IF of 8.0 [MHz] and the image signals having the IF of 0 [MHz] on a direct current component having a frequency of zero and generated from the transmission signals, are output as outputs of the quadrature detector 18, as illustrated in FIG. 6(c).

Therefore, the reception signals having the IF of 8.0 [MHz] can be converted into a baseband of reception signals by the frequency converter 32 in which the quadrature carrier oscillator 7a outputs the complex local signals at the frequency of 8.0 [MHz].

As described above, in the third example of the first embodiment (FIG. 5), the quadrature carrier oscillator 1a,which is provided to the quadrature detector 18 on the side of the receiver 1 of the radio equipment, which has been described in the first example of the first embodiment, is modified into the quadrature carrier oscillator 6a, and the image signals of transmission signals output from the mixer 14 are directly converted into the baseband signals. Therefore, while characteristics of the transmission signals are obtained, the number of times for frequency conversion can be decreased and signal characteristics including the level and distortion of the transmission signals can be exactly compensated.

D. Fourth Example of the First Embodiment

Figure 7:
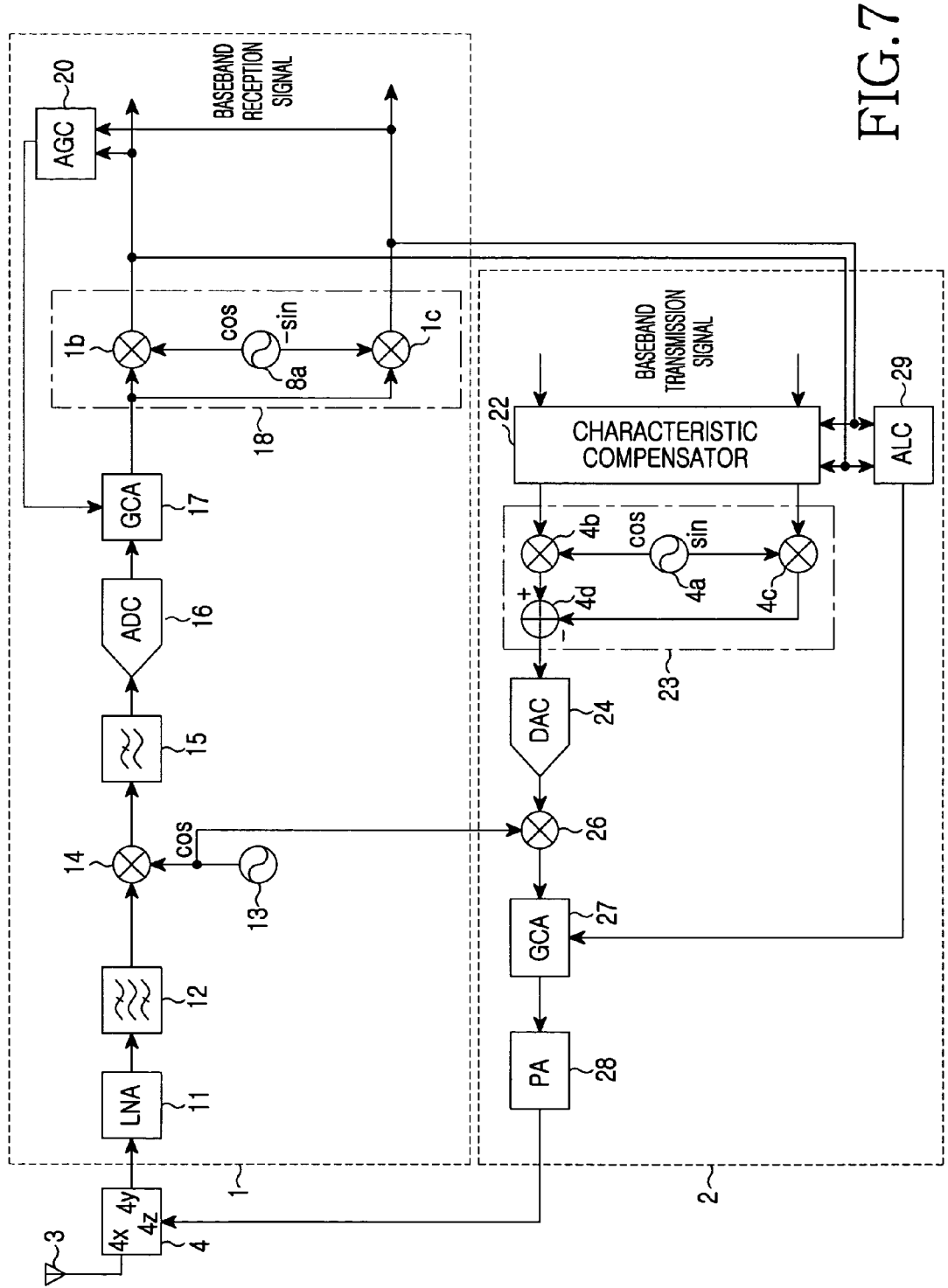
FIG. 7 is a block diagram illustrating radio equipment for compensating transmission signals according to a fourth example of the first embodiment of the present invention.

FIG. 7 is a block diagram illustrating radio equipment for compensating transmission signals in accordance with a fourth example of the first embodiment of the present invention.

In FIG. 7, the radio equipment for compensating transmission signals is characterized in that the frequency converter 32 on the side of the receiver 1 of the radio equipment, which has been described in the third example of the first embodiment, has been omitted, the quadrature detector 18 on the side of the receiver 1 is provided with a quadrature carrier oscillator 8a for outputting complex local signals having a eighth frequency equal to the carrier frequency which the image signals of the transmission signals output from the digital GCA 17 have, instead of the quadrature carrier oscillator 6a for outputting the complex local signals having the sixth frequency equal to the carrier frequency which the image signals of the transmission signals output from the digital GCA 17 have, and reception signals having the IF A are converted into a baseband of image signals by the quadrature detector 18.

Further, the radio equipment of this embodiment is characterized in that image signals of transmission signals are converted into image signals having the IF F by the quadrature detector 18, and thus the characteristic compensator 22 is removed, and in that without compensating distortion of phase and amplitude of the transmission signals caused by the baseband of image signals, only a mean level of the transmission signals is detected by the ALC circuit 29 and only a level of the transmission signals is controlled through a feedback control of the analog GCA 27. Further, in FIG. 7, components having the same reference numeral and symbol as in the first example of the first embodiment perform the same operation as ones mentioned in the first example of the first embodiment, and thus a description of these components is omitted here.

Referring to FIG. 7, the radio equipment is designed so that reception signals and image signals of transmission signals which the digital GCA 17 outputs at the IF A are input into the quadrature detector 18 having a quadrature carrier oscillator for outputting complex local signals having a eighth frequency equal to the carrier frequency of the reception signals having the IF A, so that at least reception signals having the IF A are directly converted into a baseband of reception signals.

The image signals of the transmission are converted into image signals having the IF F by the quadrature detector 18, so that the converted image signals are input into the ALC circuit 29 as they are. In the ALC circuit 29, a mean level of the transmission signals transmitted from the antenna 3 is detected using the image signals having the IF F as reference signals, and the detected mean level is controlled to be fed back to the analog GCA 27 to uniformly maintain the detected mean level. In addition, in the process of digital signals, a level of the digital signals is detected by calculating a sum of two squares of real-axis signals and imaginary-axis signals of input complex signals, so that the mean level of the transmission signals can be detected even when the image signals having the IF F are used as reference signals as they are.

Subsequently, using the radio equipment of the present embodiment as described above, a detailed description will be made with reference to a schematic diagram regarding a structure in which transmission signals transmitted from the antenna 3 are input as reference signals into the ALC circuit 29.

Figure 8:
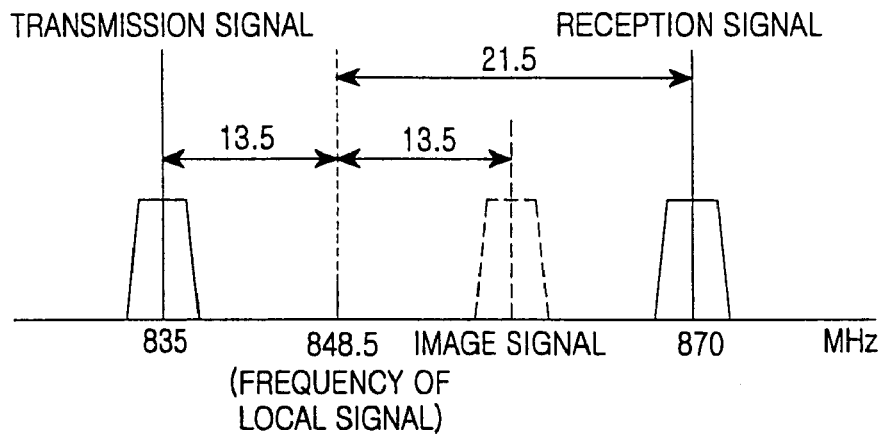
FIG. 8 is a schematic diagram illustrating an arrangement of transmission and reception signals on a frequency axis in the fourth example of the first embodiment of the present invention.
Figure 8:
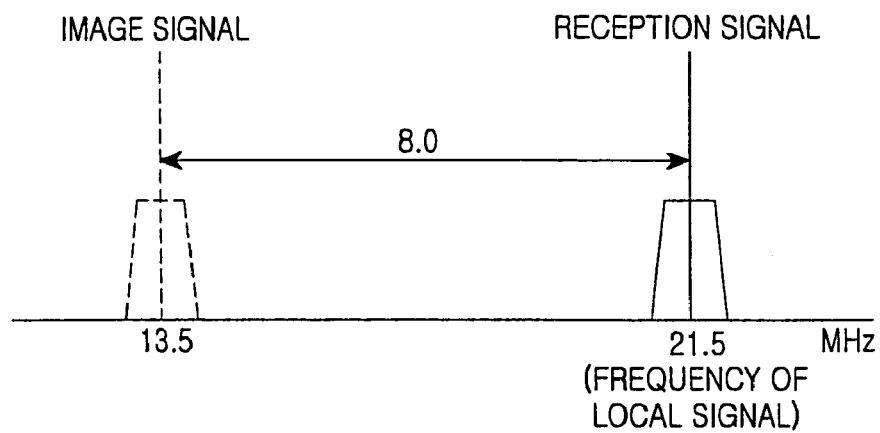
Figure 8:
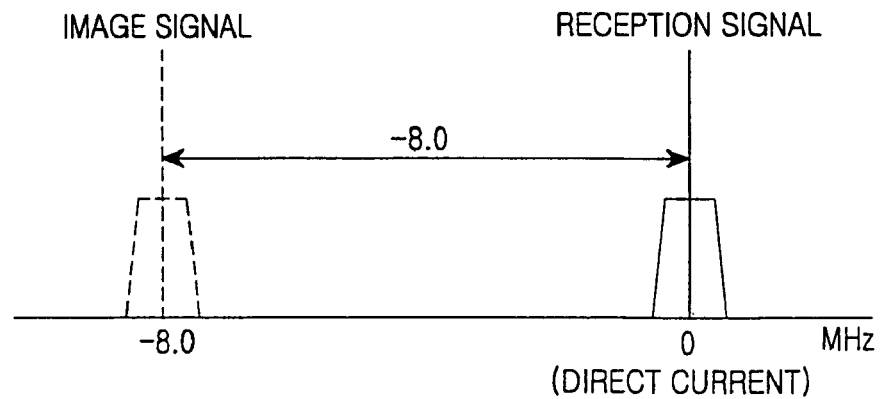

FIG. 8 is a schematic diagram for describing a structure in which transmission signals transmitted from the antenna 3 are obtained as reference signals at the ALC circuit 29, and illustrates, similar to FIGS. 2 and 6, transmission signals having a frequency of 835 [MHz], reception signals having a frequency of 870 [MHz], and local signals output from the carrier oscillator 13 having a first frequency of 848.5 [MHz].

As illustrated in FIG. 8(a), when the transmission signals are input into the mixer 14 at the carrier frequency of 835 [MHz] and when the reception signals are input into the mixer 14 at the carrier frequency of 870 [MHz], both of the transmission and reception signals are frequency-converted by local signals which the carrier oscillator 13 outputs at the frequency of 848.5 [MHz], so that reception signals having the IF of 21.5 [MHz] and image signals having the IF of 13.5 [MHz] and generated from the transmission signals are output from the mixer 14, as illustrated in FIG. 8(b). Further, when the reception signals having the IF of 21.5 [MHz] and the image signals having the IF of 13.5 [MHz] and generated from the transmission signals are input into the quadrature detector 18, in which the complex local signals output from the quadrature carrier oscillator 6a are set to have a frequency of 13.5 [MHz], image signals having the IF of −8.0 [MHz] and generated from the transmission signals and the reception signals having the IF of 0 [MHz] on a direct current component having a frequency of zero are output as outputs of the quadrature detector 18, as illustrated in FIG. 8(c).

Therefore, the ALC circuit 29 detects the mean level of the transmission signals using the image signals having the IF of −8.0 [MHz] as they are.

As described above, in the fourth example of the first embodiment, the frequency converter 32 on the side of the receiver 1 of the radio equipment, which has been described in the third example of the first embodiment, is removed, and the reception signals having the IF A and output from the digital GCA 17 are directly converted into a baseband of signals by the quadrature detector 18, which includes a quadrature carrier oscillator 8a for outputting complex local signals having a eighth frequency equal to the carrier frequency of the reception signals having the IF A. Therefore, when only the level of the transmission signals is compensated, a change of the level of the transmission signals is detected from the image signals in a state of the IF, and the compensator compensates the level of the transmission signals. As a result, the process for changing the transmission signals into the baseband is eliminated and thus a circuit construction can be simplified.

II. Second Embodiment

Figure 9:
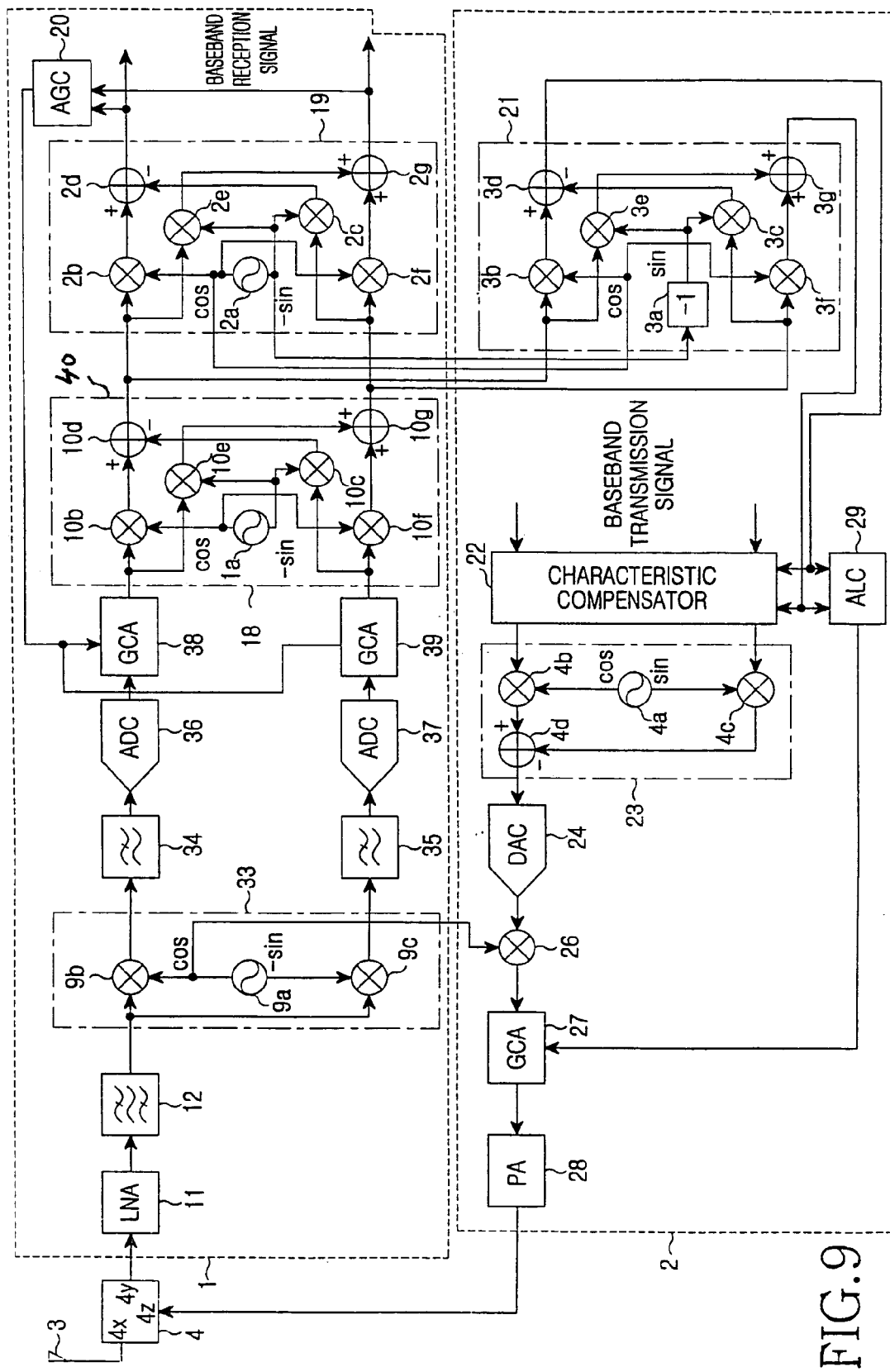
FIG. 9 is a block diagram illustrating radio equipment for compensating transmission signals according to a first example of a second embodiment of the present invention.

Subsequently, a description will be made regarding a second embodiment with reference to the drawings A. First Example of the Second Embodiment FIG. 9 is a block diagram illustrating radio equipment for compensating transmission signals in accordance with a first example of a second embodiment of the present invention. In FIG. 9, the radio equipment for compensating transmission signals is characterized in that the mixer 14 of the radio equipment, which has been described in the first example of the first embodiment, is changed into a quadrature detector 33 having a quadrature carrier oscillator for outputting complex local signals having a first frequency. Further, in FIG. 9, components having the same reference numeral and symbol as in the first example of the first embodiment perform the same operation as ones mentioned in the first example of the first embodiment, and thus a description of these components is omitted here.

With reference to FIG. 9, to extract desired signals having a carrier frequency from a predetermined frequency band of signals which a reception filter 12 outputs, and to quantize (i.e., perform A/D conversion of) the extracted signals, by a quadrature detector 33 having a quadrature carrier oscillator for outputting complex local signals having a first frequency, the signals are converted into complex signals having an IF. With respect to respective real-axis signals and imaginary-axis signals of the complex signals having the IF, low-pass filters 34 and 35 impose band limitations on the complex signals output from quadrature detector 33 at a frequency less than half of a sampling frequency for quantization.

Further, when the complex signals are band-limited by the low-pass filters 34 and 35, a receiver 1 changes the respective real-axis signals and imaginary-axis signals of the complex signals band-limited by the low-pass filters 34 and 35 into digital ones, using ADCs (A/D converters) 36 and 37 for quantizing input signals at the sampling frequency corresponding to a bandwidth of the low-pass filters 34 and 35 according to the sampling theorem.

The quantized complex signals output from the ADCs 36 and 37 are converted into complex signals having a uniform level by GCAs 38 and 39, which maintain output signals at a uniform level by controlling a degree of amplification to amplify input signals.

Further, the complex signals, which the digital GCAs 38 and 39 output, contain reception signals and image signals of transmission signals, both of which have the IF A and are represented as a complex number. The receiver 1 converts the reception signals and the image signals of the transmission signals into reception signals having an IF B and image signals having an IF C, both of which are represented as a complex number and have positive and negative carrier frequencies symmetrical to a direct current component having a frequency of zero, by a frequency converter 40 having a quadrature carrier oscillator for outputting complex local signals at a second frequency located at the middle of each carrier frequency. The reception signals having the IF B are converted into a baseband of reception signals by a frequency converter 19 having a quadrature carrier oscillator for outputting complex local signals having a third frequency which is equal to the carrier frequency of the reception signals having the IF B.

Further, the transmitter 2 converts image signals, which the frequency convert 40 outputs at the IF C, into a baseband of image signals, by a frequency converter 21, in which complex codomain signals of the complex local signals, which the quadrature carrier oscillator 2a of the frequency converter 19 outputs at the third frequency, are taken as local signals having a fourth frequency.

In this manner, the radio equipment for compensating transmission signals directly acquires image signals of the transmission signals in a state of complex signals.

Further, the quadrature detector 33 includes a quadrature carrier oscillator 9a for outputting complex local signals having a first frequency, and multipliers 9b and 9c for multiplying real signals, which the reception filter 12 outputs, by real-axis signals "cos" of local signals which the quadrature carrier oscillator 9a outputs at the first frequency, and by imaginary-axis signals "-sin" which have a phase forwarded by 90 degrees relative to that of the real-axis signals, respectively. The quadrature detector 33 obtains complex number signals by performing orthogonal transformation to the real signals which the reception filter 12 outputs.

The frequency converter 40 includes the quadrature carrier oscillator 1a for outputting complex local signals having the second frequency which is located at the middle of respective carrier frequency of the reception signals and the image signals of the transmission signals, both of which the digital GCAs 38 and 39 output at the IF A represented as a complex number, and multipliers 10b and a multiplier 10c for multiplying real and imaginary-axis signals of the complex signals, which the digital GCAs 38 and 39 output, by real-axis signals "cos" of local signals which the quadrature carrier oscillator 1a outputs at the second frequency, and by imaginary-axis signals "-sin" which have a phase forwarded by 90 degrees relative to that of the real-axis signals, respectively. A subtracter 10d for subtracts outputs of the multiplier 10c from outputs of the multiplier 10b and takes the subtracted results as outputs of the real-axis signals, multipliers 10e and 10f multiply real and imaginary-axis signals of the complex signals, which the digital GCAs 38 and 39 output, by imaginary-axis signals "-sin" and real-axis signals "cos", respectively, of local signals which the quadrature carrier oscillator 1a outputs at the second frequency, and an adder 10g for adds outputs of the multiplier 10f to outputs of the multiplier 10e and taking the added results as outputs of the imaginary-axis signals. The frequency converter 40 performs frequency conversion of the reception signals and the image signals of the transmission signals, both of which the digital GCAs 38 and 39 output at the IF A represented as a complex number.

Figure 10:
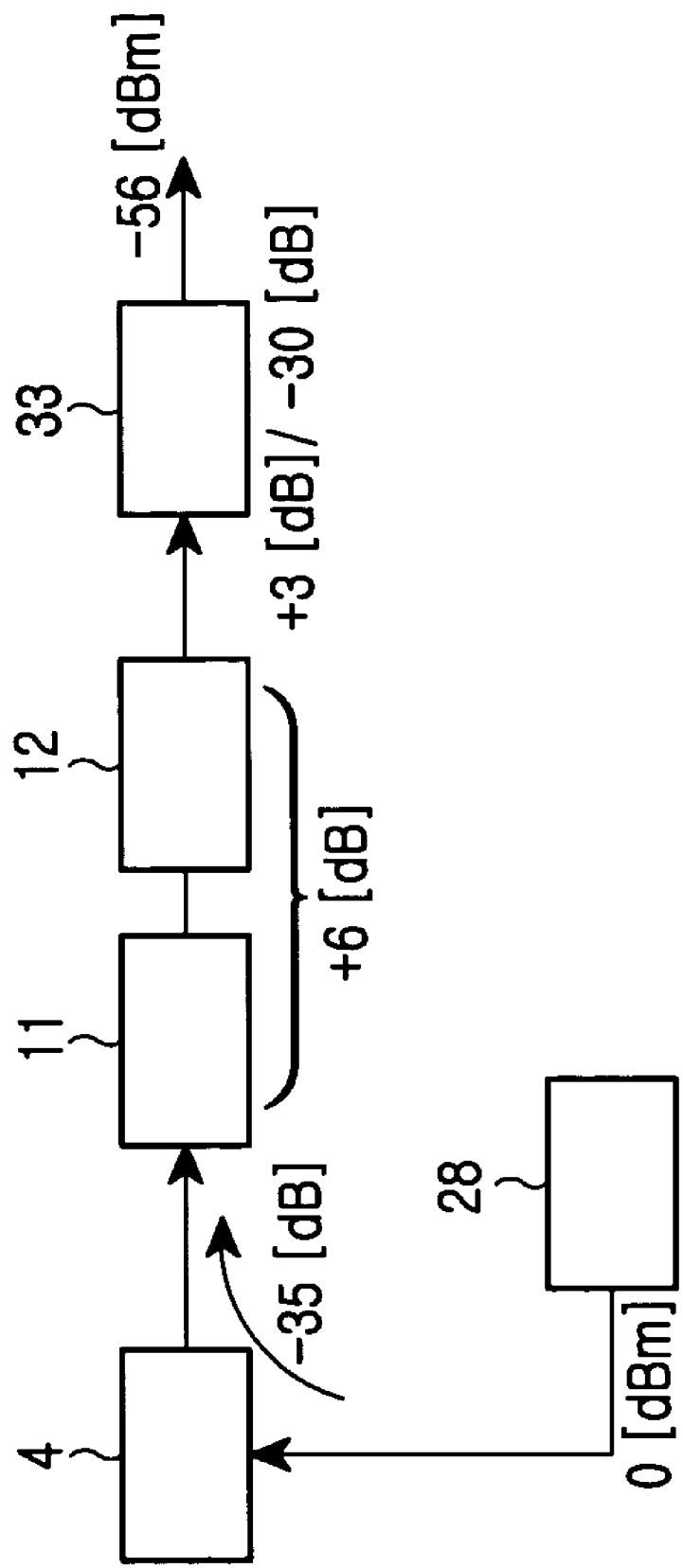
FIG. 10 is a schematic diagram illustrating a level of transmission signals obtained on the side of a receiver in the first example of the second embodiment of the present invention.

Additionally, when a level of the image signals of the transmission signals is calculated at the output of the quadrature detector 33, as illustrated in the schematic diagram of FIG. 10, for example, when the transmission signals transmitted from the antenna 3 has a level of 0 [dBm], the antenna sharer (duplexer) 4 has a leakage electrical power attenuation quantity of 35 [dB], the LNA 11 and the reception filter 12 have the total gain of 6 [dB], the quadrature detector 33 has a gain of 3 [dB], and the image signals of the quadrature detector 33 has a suppressed level of 30 [dB], the level of the image signals of the transmission signals is obtained at the output of the quadrature detector 33 by the following Equation 2.

Equation 2

$$0\ [\text{dBm}] - 35\ [\text{dB}] + 6\ [\text{dB}] + 3\ [\text{dB}] - 30\ [\text{dB}] = -56\ [\text{dB}] \quad (2)$$

As described above, in FIG. 9, the mixer 14 of the radio equipment having a function of compensating transmission signals, which has been described in the first example of the first embodiment, is changed into the quadrature detector 33, so that the level of the image signals of the transmission signals can be obtained at a level without influencing the reception signals. For instance, in the case of radio equipment in which transmission signal waves and reception signal waves are easily separated from each other even when they are overlapped with each other at a frequency of the same carriers as signals based on a CDMA (Code Division Multiple Access) or TDD mode, the reception signals and the image signals of the transmission signals, both of which have the first IF, are extracted by the same frequency, so that the number of times for performing frequency conversion can be reduced in the following processes, and thus a circuit construction can be simplified.

B. Second to Fourth Examples of the Second Embodiment

In the second embodiment, as in the second to fourth examples of the first embodiment which have been described using FIGS. 4 to 8 in the first embodiment, the frequency converter 19 and the frequency converter 21 shown in FIG. 9 may be changed into a synthetic frequency converter 20 (second example of the second embodiment), the frequency converter 19 may be changed into a frequency converter 32, while the frequency converter 21 is removed (third example of the second embodiment), the frequency converter 19 may be removed together with the frequency converter 21 (fourth example of the second embodiment).

Further, similar to the quadrature detector 18 described in the first embodiment, the quadrature carrier oscillator of the frequency converter 40 uses a quadrature carrier oscillator 1a for the second example, a quadrature carrier oscillator 6a for the third example, and a quadrature carrier oscillator 8a for the fourth example.

Thus, the second to fourth examples of the second embodiment can get the same effects as in the second to fourth examples of the first embodiment.

III. Third Embodiment

Herein below, a description will be made regarding a third embodiment of the present invention with reference to the drawings.

A. First Example of the Third Embodiment

Figure 11:
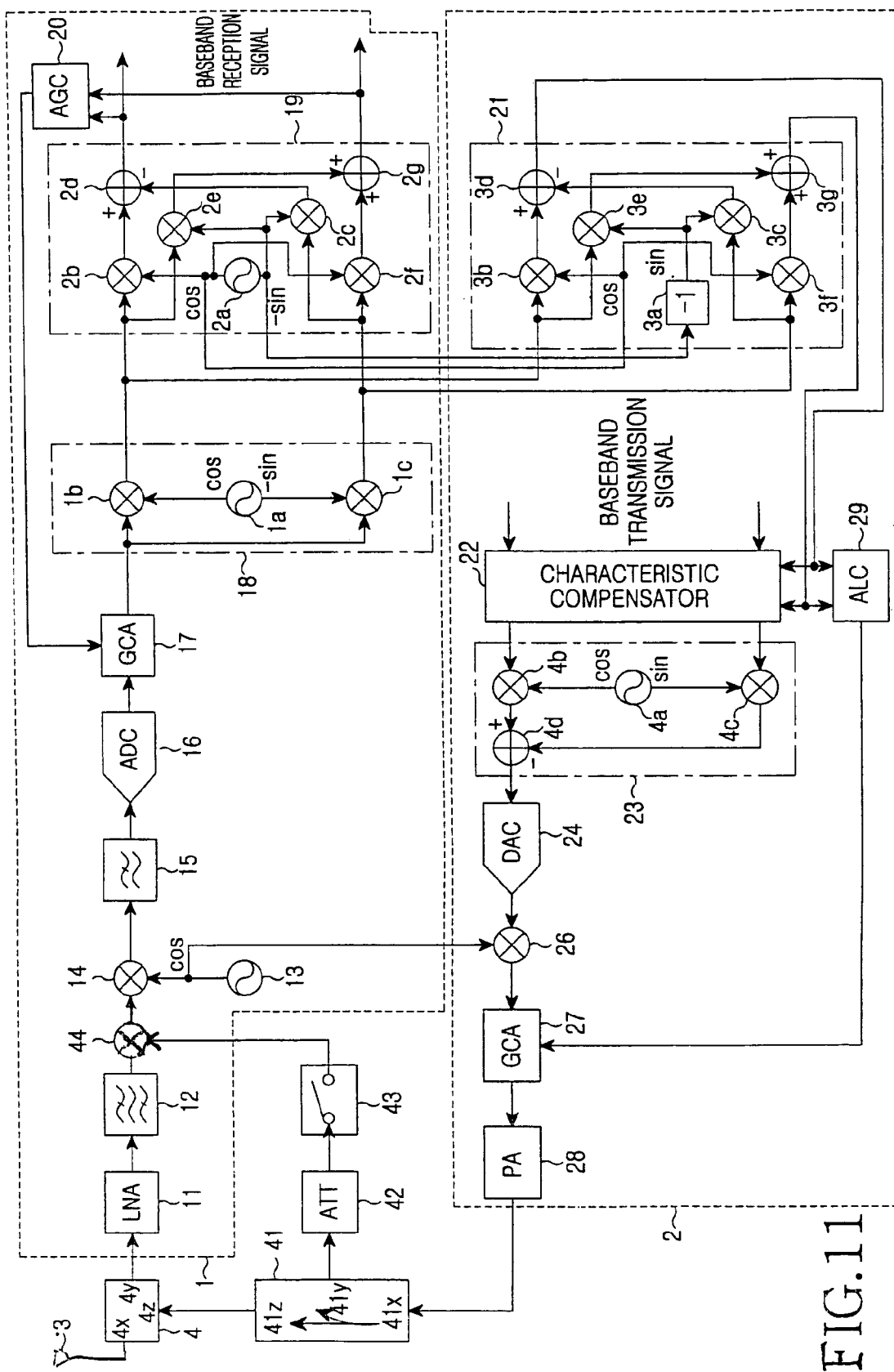
FIG. 11 is a block diagram illustrating radio equipment for compensating transmission signals according to a first example of a third embodiment of the present invention.

FIG. 11 is a block diagram illustrating radio equipment for compensating transmission signals in accordance with a first example of the third embodiment of the present invention. In FIG. 11, the radio equipment is characterized in that, in the radio equipment, which has been described in the first example of the first embodiment, the transmission signals input toward the receiver 1 are not obtained as the leakage electrical power from the transmitter-sided input terminal 4z of the antenna sharer 4 to the receiver-sided output terminal 4y, but are explicitly obtained using a transmission signal separator for separating a part of the electrical power of the transmission signals and a mixer for mixing the separated transmission signals with the reception signals. Further, in FIG. 11, components having the same reference numeral and symbol as in the first example of the first embodiment perform the same operation as ones mentioned in the first example of the first embodiment, and thus their description is omitted here.

With reference to FIG. 11, the radio equipment inserts a directional coupler 41 between the PA 28 and the transmitter-sided input terminal 4z of the antenna sharer 4, and inputs the transmission signals output from the PA 28 into an input terminal 41x of the directional coupler 41 in order to transmit the transmission signals to the antenna 3. In the directional coupler 41, some parts of input transmission signals are separated and output from a separation output terminal 41y, most remaining transmission signals are output from an output terminal 41z. The transmission signals, which are output from the output terminal 41z of the directional coupler 41, are sent from the transmitter-sided input terminal 4z of the antenna sharer 4 connected to the output terminal 41z of the directional coupler 41 through the antenna connection terminal 4x to the antenna 3, and transmitted to other radio equipment.

Some parts of the transmission signals, which are output from the separation output terminal 41y of the directional coupler 41, are input through an ATT 42 for attenuating and outputting input electrical power and a switch 43 toward the receiver 1.

In the receiver 1, a mixer 44 is inserted between the reception filter 12 and the mixer 14, both of which have been mentioned in the first example of the first embodiment. The mixer 44 mixes the signals from the reception filter 12 with the transmission signals output from the switch 43 and outputs the mixed results to the mixer 14.

Therefore, the radio equipment for compensating transmission signals according to the present embodiment is designed so that, when a frequency characteristic is bad on a communication band edge or when the leakage electrical power of the antenna sharer is small due to an available frequency band in a multi-band radio equipment, the switch 43 is closed and then the transmission signals separated by the directional coupler 41 are input toward the receiver 1 by the mixer 44 and are obtained at a proper level on the side of the receiver 1. Further, in the other cases, the transmission signals are obtained at a proper level using the antenna sharer 4.

Further, the transmission signals separated by the directional coupler 41 are input toward the receiver 1 by the mixer 44 at any time without the switch 43.

Figure 12:
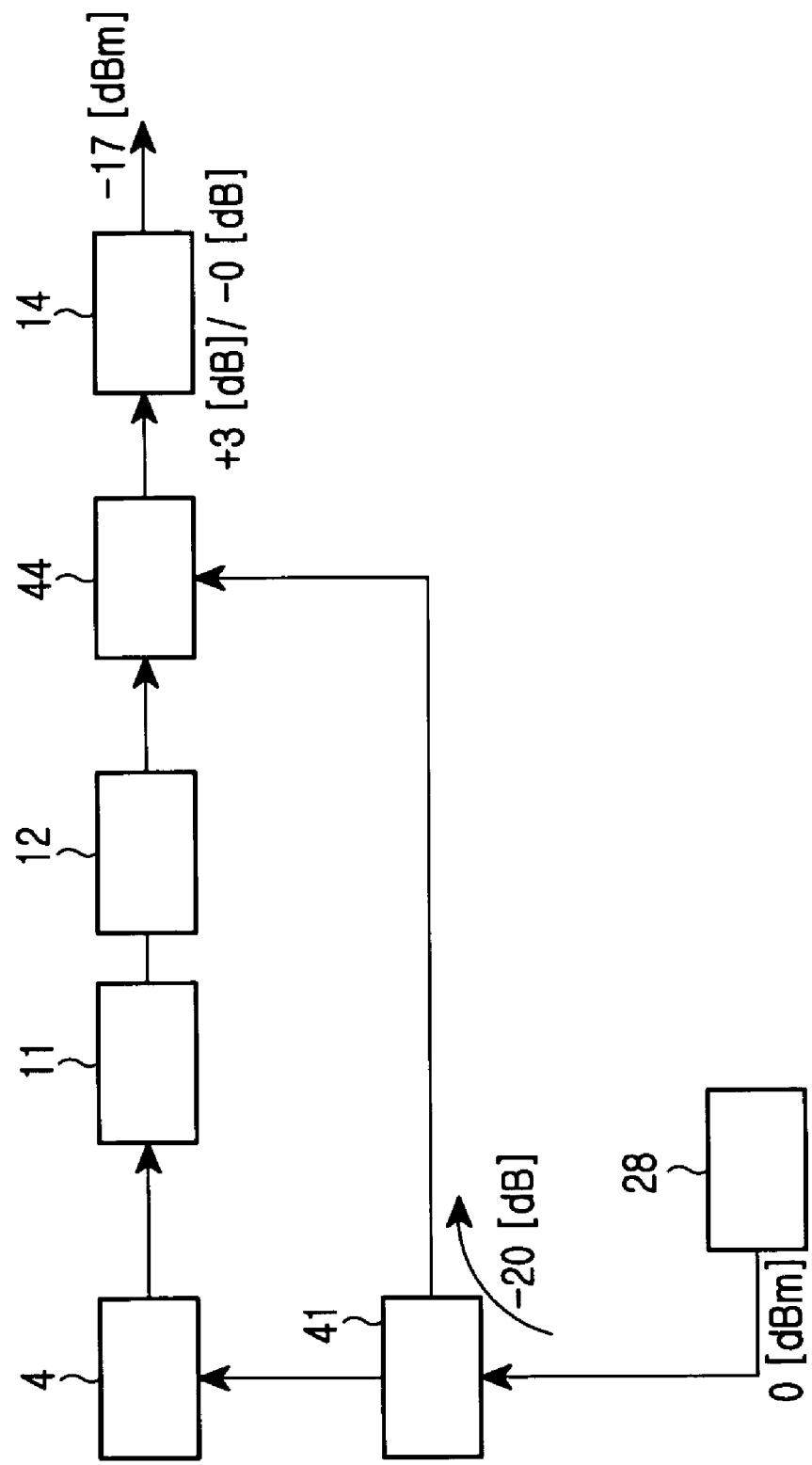
FIG. 12 is a schematic diagram illustrating a level of transmission signals obtained on the side of a receiver in the first example of the third embodiment of the present invention.

Additionally, when a level of the image signals of the transmission signals is calculated at the output of the mixer 14, as shown in the schematic diagram of FIG. 12, for example, when the transmission signals transmitted from the antenna 3 has a level of 0 [dBm], the directional coupler 41 has a combination degree of 20 [dB], the mixer 44 has a loss of 0 [dB], the mixer 14 has a gain of 3 [dB], and the image signals of the mixer 14 has a suppressed level of 0 [dB]. When the ATT 42 is used without any insertion, the level of the image signals of the transmission signals is obtained at the output of the mixer 14 by the following Equation 3.

Equation 3

$$0 \text{ [dBm]} - 20 \text{ [dB]} - 0 + \text{[dB]} + 3 \text{ [dB]} - 0 \text{ [dB]} = -17 \text{ [dB]} \quad (3)$$

Thus, it is preferable to insert and use the ATT 42.

As described above, the first example of the third embodiment is designed so that, in the radio equipment having a function of compensating transmission signals which has been described in the first example of the first embodiment, the transmission signals input toward the receiver 1 are not obtained as the leakage electrical power from the transmitter-sided input terminal 4z of the antenna sharer 4 to the receiver-sided output terminal 4y. The radio equipment of the first example of the third embodiment includes the direction coupler 41 for separating a part of the electrical power of the transmission signals, the mixer 44 for mixing the separated transmission signals with the reception signals and the switch 43 for opening and closing between the directional coupler 41 and the mixer 43. When the transmission signals input toward the receiver 1 have a low level, the switch 43 is closed and then the transmission signals separated by the directional coupler 41 are input toward the receiver 1 by the mixer 44 and are obtained at a proper level on the side of the receiver 1. Further, in the other cases, the transmission signals are obtained at a proper level using the antenna sharer 4. Under any circumstances, proper transmission signals can be input toward the receiver.

B. Second to Fourth Examples of the Third Embodiment

In the third embodiment, as in the second to fourth examples of the first embodiment which have been described using FIGS. 4 to 8 in the first embodiment, the frequency converter 19 and the frequency converter 21 shown in FIG. 11 in the first example of the third embodiment may be changed into a synthetic frequency converter 30 (second example of the third embodiment), the frequency converter 19 may be changed into a frequency converter 32, while the frequency converter 21 is removed (third example of the third embodiment), the frequency converter 19 may be removed together with the frequency converter 21 (fourth example of the third embodiment).

Further, as described in the first embodiment, the quadrature carrier oscillator of the quadrature detector 18 is adapted to make use of a quadrature carrier oscillator 1a for the second example, a quadrature carrier oscillator 6a for the third example, and a quadrature carrier oscillator 8a for the fourth example.

Thus, the second to fourth examples of the third embodiment can get the same effects as in the second to fourth examples of the first embodiment.

IV. Fourth Embodiment

Finally, a description will be made regarding a fourth embodiment of the present invention with reference to the drawings.

A. First Example of the Fourth Embodiment

Figure 13:
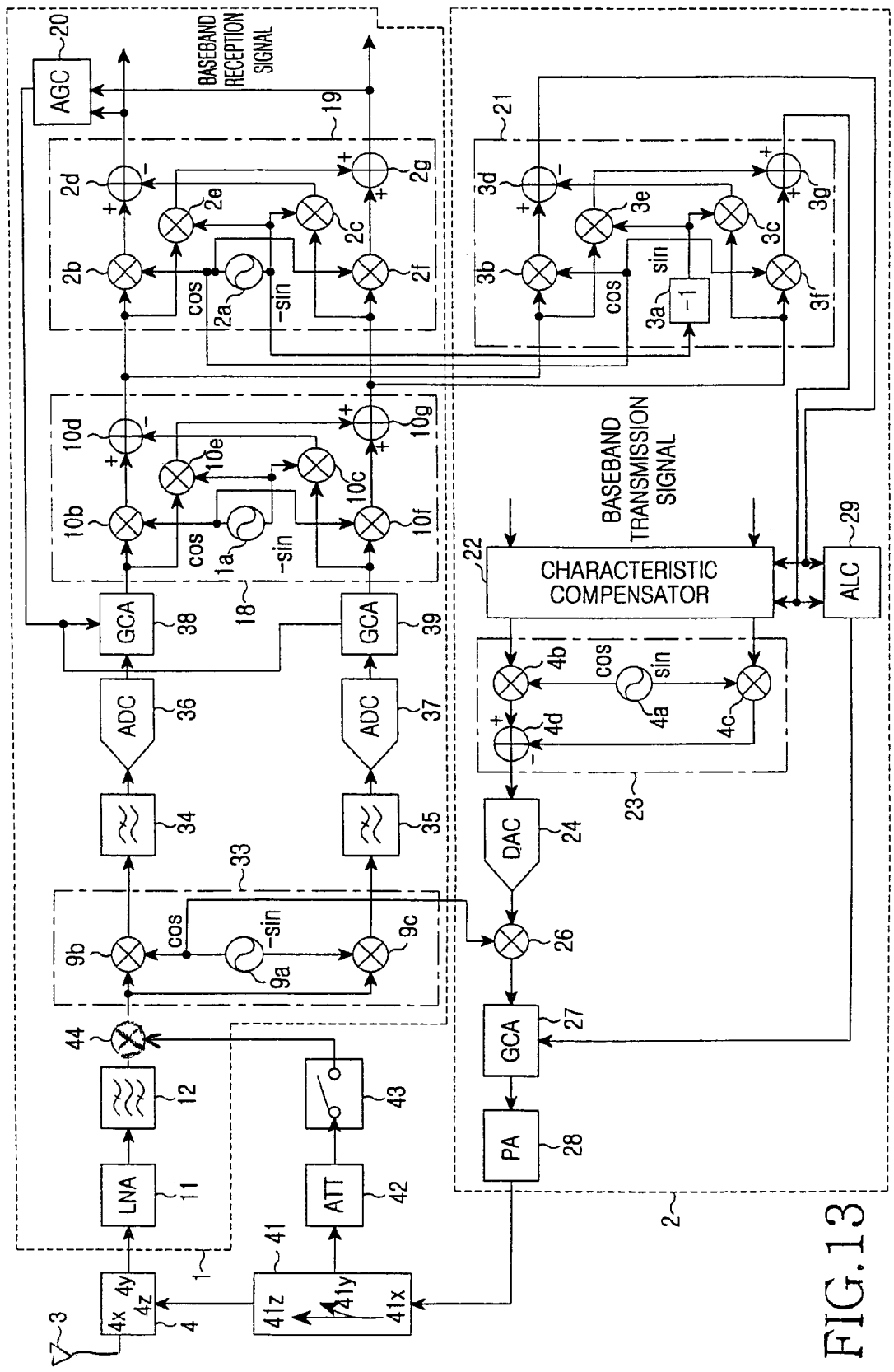
FIG. 13 is a block diagram illustrating radio equipment for compensating transmission signals according to a first example of a fourth embodiment of the present invention.

FIG. 13 is a block diagram illustrating radio equipment for compensating transmission signals in accordance with a first example of the fourth embodiment of the present invention. In the present embodiment, the radio equipment having a function of compensating transmission signals is characterized in that, in the radio equipment having a function of compensating transmission signals which has been described in the first example of the first embodiment, the transmission signals input toward the receiver 1 are not obtained as the leakage electrical power from the transmitter-sided input terminal 4z of the antenna sharer 4 to the receiver-sided output terminal 4y, but are explicitly obtained using a transmission signal separator for separating a part of the electrical power of the transmission signals and a mixer for mixing the separated transmission signals with the reception signals. Further, in FIG. 13, components having the same reference numeral and symbol as in the first example of the first embodiment and as in the first example of the second embodiment perform the same operation as ones mentioned in the first example of the first embodiment and in first example of the second embodiment, and thus their description is omitted here.

Referring to FIG. 13, the radio equipment inserts a directional coupler 41 between the PA 28 and the transmitter-sided input terminal 4z of the antenna sharer 4, and inputs the transmission signals output from the PA 28 into an input terminal 41x of the directional coupler 41 in order to transmit the transmission signals to the antenna 3. Similar to the third embodiment, in the directional coupler 41, some parts of input transmission signals are separated and output from a separation output terminal 41y, most remaining transmission signals are output from an output terminal 41z. Some parts of the transmission signals, which are output from the separation output terminal 41y of the directional coupler 41, are input through an ATT 42 and a switch 43 toward the receiver 1.

In the receiver 1, a mixer 44 is inserted between the reception filter 12 and the mixer 14 of the radio equipment having a function for compensating transmission signals which has been mentioned in the first example of the second embodiment. The mixer 44 mixes the signals from the reception filter 12 with the transmission signals output from the switch 43, and then outputs the mixed results to the quadrature detector 33.

Therefore, the radio equipment in FIG. 13 is designed so that, when a frequency characteristic is bad on a communication band edge or when the leakage electrical power of the antenna sharer is small due to an available frequency band in a multi-band radio equipment, the switch 43 is closed, and then the transmission signals separated by the directional coupler 41 are input toward the receiver 1 by the mixer 44 and are obtained at a proper level on the side of the receiver 1. Further, in the other cases, the transmission signals are obtained at a proper level using the antenna sharer 4.

Further, similar to the third embodiment, it does not matter that the transmission signals separated by the directional coupler 41 are input toward the receiver 1 by the mixer 44 at any time without the switch 43.

Figure 14:
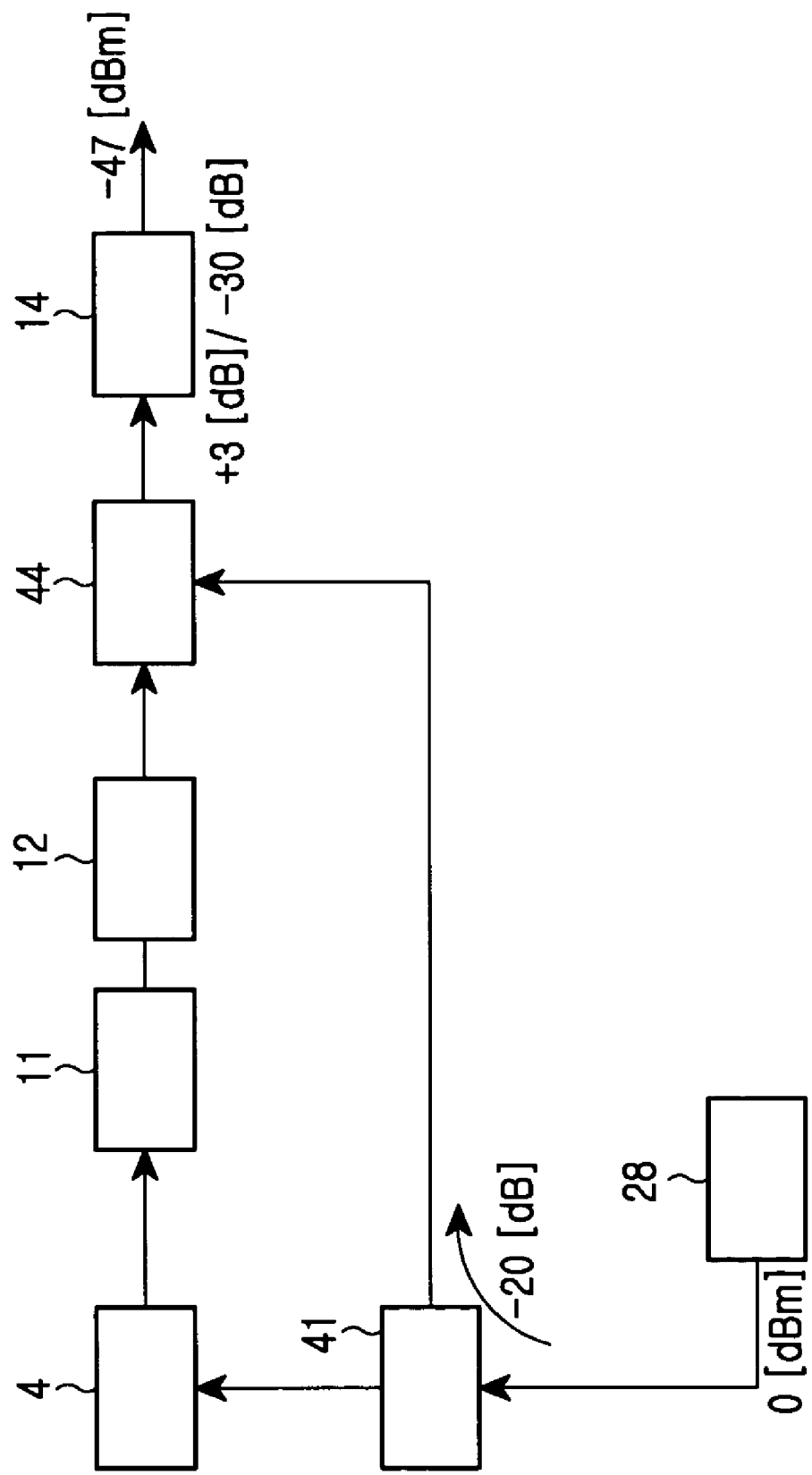
FIG. 14 is a schematic diagram illustrating a level of transmission signals obtained on the side of a receiver in the first example of the fourth embodiment of the present invention.

Additionally, in the present embodiment, when a level of the image signals of the transmission signals is calculated at the output of the quadrature detector 33, as shown in the schematic diagram of FIG. 14, for example, when the transmission signals transmitted from the antenna 3 has a level of 0 [dBm], the directional coupler 41 has a combination degree of 20 [dB], the mixer 44 has a loss of 0 [dB], the quadrature detector 33 has a gain of 3 [dB], and the image signals of the quadrature detector 33 has a suppressed level of 0 [dB], the level of the image signals of the transmission signals is obtained at the output of the quadrature detector 33 by the following Equation 4.

Equation 4

$$0 \,[\text{dBm}] - 20 \,[\text{dB}] - 0 \,[\text{dB}] + 3 \,[\text{dB}] - 30 \,[\text{dB}] = -47 \,[\text{dB}] \qquad (4)$$

Thus, it is unnecessary to insert and use the ATT 42 at all times.

As described above, the first example of the fourth embodiment is designed so that, in the radio equipment having a function of compensating transmission signals, which has been described in the first example of the second embodiment, the transmission signals input toward the receiver 1 are not obtained as the leakage electrical power from the transmitter-sided input terminal 4z of the antenna sharer 4 to the receiver-sided output terminal 4y. The radio equipment of the first example of the fourth embodiment includes the direction coupler 41 for separating a part of the electrical power of the transmission signals, the mixer 44 for mixing the separated transmission signals with the reception signals and the switch 43 for opening and closing between the directional coupler 41 and the mixer 43. When the transmission signals input toward the receiver 1 has a low level, the switch 43 is closed, and then the transmission signals separated by the directional coupler 41 are input toward the receiver 1 by the mixer 44 and are obtained at a proper level on the side of the receiver 1. Further, in the other cases, the transmission signals are obtained at a proper level using the antenna sharer 4. Under any circumstances, the transmission signals can be input toward the receiver at a proper level.

B. Second to Fourth Examples of the Fourth Embodiment

In the fourth embodiment, as in the second to fourth examples of the first embodiment, which have been described using FIGS. 4 to 8 in the first embodiment, the frequency converter 19 and the frequency converter 21 shown in FIG. 13 in the first example of the fourth embodiment may be changed into a synthetic frequency converter 30 (second example of the fourth embodiment), the frequency converter 19 may be changed into a frequency converter 32, while the frequency converter 21 is removed (third example of the fourth embodiment), the frequency converter 19 may be removed together with the frequency converter 21 (fourth example of the fourth embodiment).

Further, similar to the quadrature detector 18 described in the first embodiment, the quadrature carrier oscillator of the frequency converter 40 is adapted to make use of a quadrature carrier oscillator 1a for the second example, a quadrature carrier oscillator 6a for the third example, and a quadrature carrier oscillator 8a for the fourth example, respectively.

Thus, the second to fourth examples of the fourth embodiment can accomplish the same effects as in the second to fourth examples of the first embodiment.

Furthermore, it is described in the first examples of the first to fourth embodiments that the quadrature carrier oscillator 2a is provided on the side of the frequency converter 19, and that the frequency converter 21 generates the complex codomain signals of the complex local signals which the quadrature carrier oscillator 2a outputs, by inverting the sign of the imaginary-axis signals of the complex local signals which the quadrature carrier oscillator 2a outputs using the sign inverter 3a, and uses the generated signals as the local signals. However, it does not matter that the quadrature carrier oscillator is provided on the side of the frequency converter 21, and that the frequency converter 19 generates the complex codomain signals of the complex local signals which the quadrature carrier oscillator on the side of the frequency converter 21 outputs by mean of the sign inverter, and uses the generated signals as the local signals.

According to the present invention, the transmission signals, which are obtained on the side of the receiver by the transmission signal distributor, are extracted as the image signals having the carrier frequency around the first IF of the reception signals by the first frequency converter, so that without an additional new circuit construction for extracting separate transmission signals, the characteristics of the transmission signals can be compensated using the image signals as reference signals. Thus, it is possible to implement the radio equipment having a function of compensating transmission signals, which is particularly suitable for transmitting and receiving the signals based on the FDD mode, and effectively compensates level and linearity of the transmission signals.

What is claimed is:

1. A radio equipment including at least one compensator for compensating characteristics of transmission signals, a transmitter for transmitting the transmission signals, and a receiver for demodulating reception signals, comprising:

at least one transmission signal distributor for inputting the transmission signals that the transmitter transmits toward the receiver; and at least one first frequency converter for converting the reception signals into reception signals having a first intermediate frequency including a carrier frequency lower than a carrier frequency of the reception signals, and for obtaining image signals of the transmission signals having a carrier frequency around the first intermediate frequency of the reception signals, wherein the compensator compensates characteristics of the transmission signals using characteristics of the image signals.

2. The radio equipment according to claim 1, wherein the transmission signal distributor comprises an antenna sharer for inputting the transmission signals toward the receiver as leakage electrical power.

3. The radio equipment according to claim 2, wherein the antenna sharer comprises a filter for separating the transmission signals and the reception signals from each other;

wherein the filter is adjusted to prevent an attenuation pole of the filter from being positioned within a frequency band of the transmission signals, thereby enabling a signal pass-through characteristic in the frequency band of the transmission signals of the filter to have a substantial horizontal frequency characteristic and a predetermined attenuation quantity.

4. The radio equipment according to claim 1, wherein the transmission signal distributor that operates in a Frequency Duplexing Mode (FDD) mode comprises:

a transmission signal separator for separating a part of electrical power of the transmission signals; and a mixer for mixing the separated transmission signals with the reception signals.

5. The radio equipment according to claim 4, wherein the transmission signal distributor further comprises:

an antenna sharer for inputting the transmission signals toward the receiver as leakage electrical power; and a switch for connecting the transmission signal separator with the mixer, wherein, when the transmission signals are not allowed to obtain sufficient electrical power from the leakage electrical power of the antenna sharer, the switch is closed and the transmission signals are input toward the receiver using the transmission signal separator and the mixer.

6. The radio equipment according to claim 1, wherein the first frequency converter is a frequency converter for obtaining real output signals relative to real input signals.

7. The radio equipment according to claim 1, wherein the first frequency converter is a frequency converter for obtaining complex output signals relative to real input signals.

8. The radio equipment according to claim 1, further comprising a local oscillator for outputting complex local signals at a frequency equal to the carrier frequency of the image signals, and at least one second frequency converter for converting the image signals into a baseband of image signals, wherein the compensator generates compensation signals for compensating the characteristics of the transmission signals from the baseband of image signals.

9. A radio equipment including at least one compensator for compensating characteristics of transmission signals, a transmitter for transmitting the transmission signals, and a receiver for demodulating reception signals, comprising:

at least one transmission signal distributor for inputting the transmission signals that the transmitter transmits toward the receiver;

at least one first frequency converter for converting the reception signals into reception signals having a first intermediate frequency including a carrier frequency lower than a carrier frequency of the reception signals, and for obtaining image signals of the transmission signals having a carrier frequency around the first intermediate frequency of the reception signals; and at least one second frequency converter including a local oscillator for outputting complex local signals at a frequency equal to the carrier frequency of the reception signals having the first intermediate frequency, for converting the reception signals having the first intermediate frequency into a baseband of signals and for converting the image signals into image signals having a second intermediate frequency.

10. The radio equipment according to claim 9, wherein the compensator generates compensation signals for compensating the characteristics of the transmission signals from the image signals having the second intermediate frequency.

11. The radio equipment according to claim 9, wherein the compensator compensates characteristics of the transmission signals using characteristics of the image signals.

12. A radio equipment including at least one compensator for compensating characteristics of transmission signals, a transmitter for transmitting the transmission signals, and a receiver for demodulating reception signals, comprising:
- at least one transmission signal distributor for inputting the transmission signals that the transmitter transmits toward the receiver;
- at least one first frequency converter for converting the reception signals into reception signals having a first intermediate frequency including a carrier frequency lower than a carrier frequency of the reception signals, and for obtaining image signals of the transmission signals having a carrier frequency around the first intermediate frequency of the reception signals; and
- at least one second frequency converter including a local oscillator for outputting complex local signals at a middle frequency between the carrier frequency of the reception signals having the first intermediate frequency and the carrier frequency of the image signals having the first intermediate frequency, for converting the reception signals having the first intermediate frequency and the image signals having the first intermediate frequency into reception signals having a second intermediate frequency and image signals having a second intermediate frequency, both of which have positive and negative carrier frequencies symmetrical to a direct current component having a frequency of zero.

13. The radio equipment according to claim 12, further comprising a third frequency converter including a local oscillator for outputting complex local signals at the same frequency as the carrier frequency of the image signals having the second intermediate frequency, for converting the image signals having the second intermediate frequency into a baseband of image signals.

14. The radio equipment according to claim 13, further comprising a fourth frequency converter, in which complex codomain signals of the complex local signals of the third frequency converter are used as local signals of the fourth frequency converter to convert the reception signals having the second intermediate frequency into the baseband of signals.

15. The radio equipment according to claim 14, wherein the complex local signals change the third frequency converter and the fourth frequency converter, both of which have relations of the complex codomain with each other, into a synthetic converting means commonly using the third and fourth converters.

16. The radio equipment according to claim 12, wherein the compensator compensates characteristics of the transmission signals using characteristics of the image signals.

* * * * *